(12) United States Patent
Uechi et al.

(10) Patent No.: US 11,834,968 B2
(45) Date of Patent: Dec. 5, 2023

(54) STEAM GENERATION APPARATUS AND EXHAUST GAS HEAT RECOVERY PLANT

(71) Applicant: MITSUBISHI HEAVY INDUSTRIES, LTD., Tokyo (JP)

(72) Inventors: Hideyuki Uechi, Tokyo (JP); Yuichi Otani, Tokyo (JP); Fumito Kajitani, Tokyo (JP); Taichi Yoshii, Tokyo (JP); Norito Katsuki, Tokyo (JP); Kanako Nagayama, Tokyo (JP); Takahiro Hidaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/778,982

(22) PCT Filed: Nov. 26, 2020

(86) PCT No.: PCT/JP2020/043958
§ 371 (c)(1),
(2) Date: May 23, 2022

(87) PCT Pub. No.: WO2021/106986
PCT Pub. Date: Jun. 3, 2021

(65) Prior Publication Data
US 2023/0022466 A1 Jan. 26, 2023

(30) Foreign Application Priority Data

Nov. 28, 2019 (JP) .................................. 2019-214824

(51) Int. Cl.
*F01K 7/16* (2006.01)
*F22B 1/18* (2006.01)
(Continued)

(52) U.S. Cl.
CPC .................. *F01K 7/16* (2013.01); *F22B 1/18* (2013.01); *F22B 3/04* (2013.01); *F22D 1/02* (2013.01); *F22D 5/36* (2013.01); *F22G 1/00* (2013.01)

(58) Field of Classification Search
CPC . F01K 7/16; F01K 23/02; F01K 23/10; F22B 1/18; F22B 3/04; F22D 1/02; F22D 5/36; F22G 1/00; Y02E 20/16; F02C 6/18
(Continued)

(56) References Cited

U.S. PATENT DOCUMENTS 6,178,734 B1 1/2001 Shibuya et al.
6,338,241 B1 1/2002 Shibuya et al.
(Continued)

FOREIGN PATENT DOCUMENTS

EP 2541021 1/2013
EP 3486440 5/2019
(Continued)

OTHER PUBLICATIONS

International Search Report dated Feb. 2, 2021 in International Application No. PCT/JP2020/043958.
(Continued)

*Primary Examiner* — Hoang M Nguyen
(74) *Attorney, Agent, or Firm* — Wenderoth, Lind & Ponack, L.L.P.

(57) ABSTRACT

A steam generation apparatus includes: a heat medium flow passage through which a heat medium flows; a primary economizer disposed in the heat medium flow passage; a secondary economizer disposed in the heat medium flow passage at an upstream side of the primary economizer with respect to a flow direction of the heat medium; a primary evaporator disposed in the heat medium flow passage at an upstream side of the secondary economizer with respect to
(Continued)

US 11,834,968 B2

Page 2 the flow direction of the heat medium; a first flash tank for generating flash steam; a first feed water line configured to supply water heated by the primary economizer to the secondary economizer; and a second feed water line disposed so as to branch from the first feed water line and configured to supply the water heated by the primary economizer to the first flash tank.

20 Claims, 13 Drawing Sheets

(51) Int. Cl.
    *F22B 3/04*     (2006.01)
    *F22D 1/02*     (2006.01)
    *F22D 5/36*     (2006.01)
    *F22G 1/00*     (2006.01)

(58) Field of Classification Search
    USPC ........................................................ 60/39.182
    See application file for complete search history.

(56) References Cited

U.S. PATENT DOCUMENTS

| | | | |
|---|---|---|---|
| 10,227,900 | B2 * | 3/2019 | Taguchi ................. F02C 6/18 |
| 2010/0031933 | A1 | 2/2010 | Narayan et al. |
| 2010/0305768 | A1 * | 12/2010 | Holt ......................... F01K 13/02<br>60/39.182 |
| 2013/0180228 | A1 * | 7/2013 | Zhang ....................... F01K 7/22<br>60/39.182 |
| 2015/0240667 | A1 * | 8/2015 | Nanda ..................... F01K 23/10<br>415/207 |
| 2017/0051636 | A1 | 2/2017 | Hoshino et al. |
| 2020/0165971 | A1 | 5/2020 | Uechi et al. |

FOREIGN PATENT DOCUMENTS

| | | |
|---|---|---|
| JP | 6-146815 | 5/1994 |
| JP | 11-62515 | 3/1999 |
| JP | 2004-27886 | 1/2004 |
| JP | 2010-38163 | 2/2010 |
| JP | 2019-44678 | 3/2019 |

OTHER PUBLICATIONS

English translation of the International Preliminary Report on Patentability dated Jun. 9, 2022 in International Application No. PCT/JP2020/043958.
Office Action dated Jul. 8, 2021 in corresponding Taiwanese Patent Application No. 109141524.
Extended European Search Report dated Dec. 21, 2022 in corresponding European Patent Application No. 20891564.5.

* cited by examiner

STEAM GENERATION APPARATUS AND EXHAUST GAS HEAT RECOVERY PLANT

TECHNICAL FIELD

The present disclosure relates to a steam generation apparatus and an exhaust gas heat recovery plant.

BACKGROUND ART

Patent Document 1 discloses a configuration which heats feed water supplied to an economizer utilizing heat of exhaust gas (heat medium) of a gas turbine and supplies a part of the feed water flowing from the economizer toward an evaporator to a flash tank (flasher), to generate flash steam in the flash tank. With the above configuration, it is possible to generate steam utilizing heat of exhaust gas that passes the economizer and has a relatively low temperature, and enhance the efficiency of heat utilization of exhaust gas.

CITATION LIST

Patent Literature

Patent Document 1: JP2019-44678A

SUMMARY

Problems to be Solved

In the configuration described in Patent Document however, the flow rate of feed water supplied to the economizer increases in accordance with the flow rate of feed water supplied to the flash tank compared to a case where the flash tank is not provided, and thus an economizer of a larger size is required to bring the temperature of feed water supplied to the economizer closer to a saturation steam temperature. Furthermore, even in a case where the system is not provided with a flash tank, when a part of feed water flowing from the economizer toward the evaporator is supplied to a heat utilization facility of the system and utilized as a heat source an economizer of a larger size is also required to bring the temperature of feed water supplied to the economizer closer to a saturation steam temperature.

In view of the above, an object of the present disclosure is to provide a steam generation apparatus capable of enhancing the efficiency of heat utilization of a heat medium while suppressing a size increase of an economizer, as well as an exhaust gas heat recovery plant having the same.

Solution to the Problems

A steam generation apparatus according to the present disclosure includes: a heat medium flow passage through which a heat medium flows; a primary economizer disposed in the heat medium flow passage; a secondary economizer disposed in the heat medium flow passage at an upstream side of the primary economizer with respect to a flow direction of the heat medium; a primary evaporator disposed in the heat medium flow passage at an upstream side of the secondary economizer with respect to the flow direction of the heat medium; a first feed water line configured to supply water heated by the primary economizer to the secondary economizer; and a second feed water line disposed so as to branch from the first feed water line and configured to supply the water heated by the primary economizer to a heat utilization facility.

Advantageous Effects

According to the present disclosure, provided is a steam generation apparatus capable of enhancing the efficiency of heat utilization of a heat medium while suppressing a size increase of an economizer, as well as an exhaust gas heat recovery plant having the same.

BRIEF DESCRIPTION OF DRAWINGS

FIG. 3 corresponds to a steam generation apparatus (comparative example 2) which includes only one economizer and a flash tank, and which is configured to let water from the inlet of the primary evaporator flash at the flash tank to recover the ideally maximum heat quantity

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Configuration of a Combined Cycle Plant)

Figure 1:
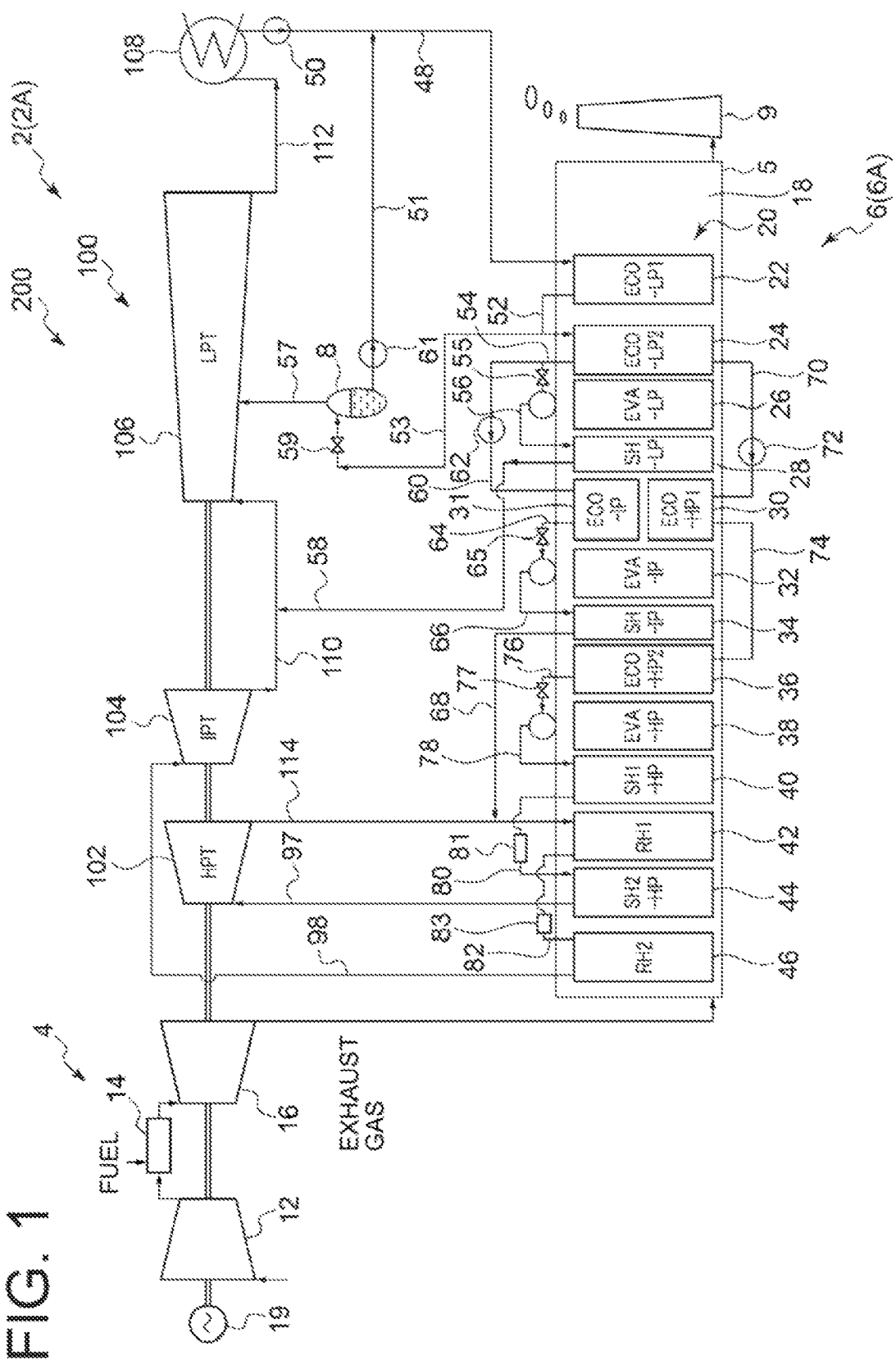
FIG. 1 is a schematic overall configuration diagram of a combined cycle plant 2 (2A) according to an embodiment.

FIG. 1 is a schematic overall configuration diagram of a combined cycle plant 2 (2A) according to an embodiment.

The combined cycle plant 2 includes a gas turbine 4 as a prime mover, a steam turbine system 100, a steam generation apparatus 6 (6A) which includes a heat recovery steam generator 5 and generates steam, and a stack 9 which releases exhaust gas discharged from the heat recovery steam generator 5 to atmosphere. The steam turbine system 100 functions as a steam utilization facility which utilizes steam generated by the steam generation apparatus 6. Furthermore, the steam generation apparatus 6 and the steam turbine system 100 constitute an exhaust gas heat recovery plant 200 for recovering exhaust heat of the gas turbine 4.

(Configuration of a Gas Turbine)

The gas turbine 4 includes a compressor 12 which compresses air, a combustor 14 which combusts a fuel by using compressed air generated by the compressor 12, and a turbine 16 to be driven by combustion air generated by the combustor 14. In the illustrated embodiment, a generator 19 is disposed on the same axis as the compressor 12 and the turbine 16, such that the respective rotors of the compressor 12, the turbine 16, and the generator 19 rotate integrally.

(Configuration of a Steam Turbine System)

The steam turbine system 100 includes a plurality of steam turbines 102, 104, 106, and a condenser 108 which cools steam discharged from the steam turbine 106 and condenses the steam to water. The steam turbine system 100 includes, as a plurality of steam turbines, a high-pressure steam turbine 102, an intermediate-pressure steam turbine 104, and a low-pressure steam turbine 106. The steam outlet of the intermediate-pressure steam turbine 104 and the steam inlet of the low-pressure steam turbine 106 are connected via an intermediate-pressure exhaust steam line 110, and the steam outlet of the low-pressure steam turbine 106 and the condenser 108 are connected via a low-pressure exhaust steam line 112. In the illustrated embodiment, the compressor 12, the turbine 16, the generator 19, the high-pressure steam turbine 102, the intermediate-pressure steam turbine 104, and the low-pressure steam turbine 106 are disposed on the same axis, and configured such that the respective motors thereof rotate integrally.

(Configuration of a Steam Generation Apparatus)

The steam generation apparatus 6 (6A) includes a heat recovery steam generator 5 to which exhaust gas (heat medium) of the gas turbine 4 is supplied, and a flash tank 8 which serves as the first flash tank. Furthermore, the flash tank 8 also serves as a heat utilization facility which receives supply of heated water and generates steam using heat of the water.

The heat recovery steam generator 5 includes an exhaust gas flow passage 18 (heat medium flow passage) through which exhaust gas of a gas turbine 4 flows, and a plurality of heat exchangers 20 disposed in the exhaust gas flow passage 18. The plurality of heat exchangers 20 include, in the following order from the downstream side with respect to the flow direction of exhaust gas of the exhaust gas flow passage 18, the primary low-pressure economizer 22 (primary economizer), the secondary low-pressure economizer 24 (secondary economizer), a low-pressure evaporator 26 (primary evaporator), a low-pressure superheater 28, the primary high-pressure economizer 30, an intermediate-pressure evaporator 32, an intermediate-pressure superheater 34, the secondary high-pressure economizer 36, a high-pressure evaporator 38, the primary high-pressure superheater 40, the primary reheater 42, the secondary high-pressure superheater 44, and the secondary reheater 46. With respect to the flow direction of exhaust gas in the exhaust gas flow passage 18, the secondary low-pressure economizer 24 is positioned at the upstream side of the primary low-pressure economizer, and the low-pressure evaporator 26 is positioned at the upstream side of the secondary low-pressure economizer 24. In the exhaust gas flow passage 18, between the low-pressure superheater 28 and the intermediate-pressure evaporator 32, an intermediate-pressure economizer 31 is disposed parallel to the primary high-pressure economizer 30.

The condenser 108 and the primary low-pressure economizer 22 are connected via a feed water line 48, and a condenser pump 50 for supplying condensed water discharged from the condenser 108 to the primary low-pressure economizer 22 is disposed in the feed water line 48.

The primary low-pressure economizer 22 heats water supplied from the feed water line 48 through heat exchange with exhaust gas. A part of water heated by the primary low-pressure economizer 22 is supplied to the secondary low-pressure economizer 24 via a feed water line 52 connecting the primary low-pressure economizer 22 and the secondary low-pressure economizer 24.

A feed water line 53 disposed so as to branch from the feed water line 52 is connected to the flash tank 8, and a part of water heated by the primary low-pressure economizer 22 is supplied to the flash tank 8 via the feed water line 53. A pressure reducing valve 59 for reducing the pressure of heated water supplied from the primary low-pressure economizer 22 is disposed in the feed water line 53. The heated water supplied to the flash tank 8 via the feed water line 53 has its pressure reduced in the flash tank 8 to evaporate (flash), and turns into flash steam. The flash steam generated in the flash tank 8 is supplied to an intermediate stage of the low-pressure steam turbine 106 via a steam line 57 connecting the flash tank 8 and the intermediate stage of the low-pressure steam turbine 106.

The condensed water accumulated at the bottom portion of the flash tank 8 flows into the feed water line 48 via a condensed water line 51 connecting the flash tank 8 and the feed water line 48, and is supplied to the primary low-pressure economizer 22 via the feed water line 48. A feed water pump 61 is disposed in the condensed water line 51, and the condensed water discharged from the flash tank 8 is pressure fed to the primary low-pressure economizer 22 by the feed water pump 61. The condensed water discharged from the flash tank 8 has a higher temperature (e.g., 90° C.) than water flowing through the feed water line 48 (e.g., 35° C.). The water flowing through the feed water line 48 mixes with the condensed water discharged from the flash tank 8, and thereby the temperature of the water flowing through the teed water line 48 increases to the feed water temperature at the inlet of the primary low-pressure economizer 22 (e.g., 60° C.). Accordingly, the temperature of feed water at the inlet of the primary low-pressure economizer 22 is maintained to be higher than the dew-point temperature of exhaust gas, and thus it is possible to prevent condensation of moisture in exhaust gas at the primary low-pressure economizer 22, and prevent corrosion even in a case where the primary low-pressure economizer 22 is formed of a relatively inexpensive material.

In the present example, a part of water heated by the primary low-pressure economizer 22 is supplied to the flash tank 8 via the feed water line 53. A part of water supplied via the feed water line 53 evaporates at the flash tank 8 and is used to drive the low-pressure steam turbine 106, and the remainder of the water is mixed with water flowing through the feed water line 48 as condensed water, and is used to heat water flowing through the feed water line 48. That is, the condensed water line 51 and the feed water pump 61 constitute a heal utilization facility which heats water flowing through the feed water line 48 by mixing water flowing through the feed water line 48 with high-temperature condensed water derived from water supplied via the feed water line 53, and the flash tank 8 and the low-pressure steam turbine 106 constitute a motive power generation apparatus Which generates motive power using water supplied via the feed water line 53 as a heat source.

If the inlet feed water of the low-pressure evaporator 26 (primary evaporator) that is usually 140° C. to 180° C. is mixed with water flowing through the feed water line 48 for heating, is means that unnecessarily high-temperature heat is used and thus the heat utilization efficiency is low. By using heated water discharged from the outlet of the primary low-pressure economizer 22 having a lower temperature than that of the inlet feed water of the low-pressure evaporator 26 (primary evaporator) to heat water flowing through the feed water line 48, it is possible utilize low-temperature heat effectively to heat intake gas, thereby enhancing the heat utilization efficiency. Heat over 100° C. is capable of generating steam of ordinary pressure, and thus heat over 100° C. and heat not over 100° C. are considerably different in terms of usefulness.

Therefore, if a to-be-heated medium is heated by mixing the inlet feed water of the low-pressure evaporator 26 (primal), evaporator) having a temperature of 140° C. to 180° C. with a to-be-heated medium having heat not over 100° C. that is less useful, the usefulness of heat would be impaired significantly. In contrast, when a to-be-heated medium not over 100° C. is heated by using heated water from the outlet of the primary low-pressure economizer 22 having a lower temperature than the inlet feed water of the low-pressure evaporator 26 (primary evaporator), it is possible to improve the heat utilization efficiency without impairing the usefulness of heat significantly. In the present embodiment, heated water from the outlet of the primary low-pressure economizer 22 is flashed to obtain steam, and the remaining condensed water of an even lower temperature is used for mixing and heating of the to-be-heated medium, and thus is possible to enhance the heat utilization efficiency even further.

The secondary low-pressure economizer 24 heats water supplied from the primary low-pressure economizer 22 via the feed water line 52 through heat exchange with exhaust gas. A part of water heated by the secondary low-pressure economizer 24 is supplied to the low-pressure evaporator 26 via the feed water line 54 connecting the secondary low-pressure economizer 24 and the low-pressure evaporator 26.

The low-pressure evaporator 26 heats and evaporates water supplied from the secondary low-pressure economizer 24 via the feed water line 54 through heat exchange with exhaust gas, thereby generating low-pressure steam. A feed water valve 55 for reducing the pressure of water supplied from the secondary low-pressure economizer 24 is disposed in the feed water line 54. A part of low-pressure steam generated by the low-pressure evaporator 26 is supplied to the low-pressure superheater 28 via a steam line 56 connecting the low-pressure evaporator 26 and the low-pressure superheater 28.

The low-pressure superheater 28 superheats low-pressure steam supplied from the low-pressure evaporator 26 via the steam line 56 through heat exchange with exhaust gas, thereby generating low-pressure superheated steam. The low-pressure superheated steam generated by the low-pressure superheater 28 flows into the intermediate-pressure exhaust steam line 110 via a steam line 58 connecting the low-pressure superheater 28 and the intermediate-pressure exhaust steam line 110, and flows into the steam inlet of the low-pressure steam turbine 106 from the intermediate-pressure exhaust steam line 110.

A part of water heated by the secondary low-pressure economizer 24 is supplied to the intermediate-pressure economizer 31 via a feed water line 60. The feed water line 60 is disposed so as to branch from the feed water line 54, and is connected to the intermediate-pressure economizer 31. The heated water flowing through the feed water line 60 is pressure fed to the intermediate-pressure economizer 31 by an intermediate-pressure feed water pump 62 disposed in the feed water line 60.

The intermediate-pressure economizer 31 heats water supplied from the secondary low-pressure economizer 24 via the feed water line 60 through heat exchange with exhaust gas. The water heated by the intermediate-pressure economizer 31 is supplied to the intermediate-pressure evaporator 32 via the feed water line 64 connecting the intermediate-pressure economizer 31 and the intermediate-pressure evaporator 32.

The intermediate-pressure evaporator 32 heats and evaporates water supplied from the intermediate-pressure economizer 31 via the feed water line 64 through heat exchange with exhaust gas, thereby generating intermediate-pressure steam. A feed water valve 65 for reducing the pressure of water supplied from the intermediate-pressure economizer 31 is disposed in the feed water line 64. A part of intermediate-pressure steam generated by the intermediate-pressure evaporator 32 is supplied to the intermediate-pressure superheater 34 via a steam line 66 connecting the intermediate-pressure evaporator 32 and the intermediate-pressure superheater 34.

The intermediate-pressure superheater 34 superheats intermediate-pressure steam supplied from the intermediate-pressure evaporator 32 via the steam line 66 through heat exchange with exhaust gas, thereby generating intermediate-pressure superheated steam. The intermediate-pressure superheated steam generated by the intermediate-pressure superheater 34 is supplied to a high-pressure exhaust steam line 114 connecting the steam outlet of the high-pressure steam turbine 102 and the steam inlet of the primary reheater 42 via a steam line 68. The intermediate-pressure superheated steam generated by the intermediate-pressure superheater 34 flows into the primary reheater 42 via the steam line 68 and the high-pressure exhaust steam line 114.

A part of water heated by the secondary low-pressure economizer 24 is supplied to the primary high-pressure economizer 30 via a feed water line 70 connecting the secondary low-pressure economizer 24 and the primary high-pressure economizer 30. The heated water flowing through the feed water line 70 is pressure fed to the high-pressure economizer 30 by a high-pressure feed water pump 72 disposed in the feed water line 70.

The primary high-pressure economizer 30 heats heated water supplied from the secondary low-pressure economizer 24 via the feed water line 70 through heat exchange with exhaust gas. The heated water heated by the primary high-pressure economizer 30 is supplied to the secondary high-pressure economizer 36 via a feed water line 74 connecting the primary high-pressure economizer 30 and the secondary high-pressure economizer 36.

The secondary high-pressure economizer 36 heats high-pressure heated water supplied from the primary high-pressure economizer 30 via the feed water line 74 through heat exchange with exhaust gas. The high-pressure heated water heated by the secondary high-pressure economizer 36 is supplied to the high-pressure evaporator 38 via a feed water line 76 connecting the secondary high-pressure economizer 36 and the high-pressure evaporator 38.

The high-pressure evaporator 38 heats and evaporates water supplied from the secondary high-pressure economizer 36 via the feed water line 76 through heat exchange with exhaust gas, thereby generating high-pressure steam. A feed water valve 77 for reducing the pressure of water supplied from the secondary high-pressure economizer 36 is disposed in the feed water line 76. The high-pressure steam generated by the high-pressure evaporator 38 is supplied to the primary high-pressure superheater 40 via a steam line 78 connecting the high-pressure evaporator 38 and the primary high-pressure superheater 40.

The primary high-pressure superheater 40 superheats high-pressure steam supplied from the high-pressure evaporator 38 via the steam line 78 through heat exchange with exhaust gas, thereby generating high-pressure superheated steam. The high-pressure superheated steam generated by the primary high-pressure superheater 40 is supplied to the secondary high-pressure superheater 44 via a steam line 80 connecting the primary high-pressure superheater 40 and the secondary high-pressure superheater 44. A desuperheater 81 for reducing the temperature of the high-pressure superheated steam flowing through the steam line 80 is disposed in the steam line 80.

The secondary high-pressure superheater 44 further superheats high-pressure superheated steam supplied from the primary high-pressure superheater 40 via the steam line 80 through heat exchange with exhaust gas. The high-pressure superheated steam generated by the secondary high-pressure superheater 44 is supplied to the high-pressure steam turbine 102 via a steam line 97 connecting the secondary high-pressure superheater 44 and the steam inlet of the high-pressure steam turbine 102.

The primary reheater 42 superheats steam supplied from the steam outlet of the high-pressure steam turbine 102 to the primary reheater 42 via the high-pressure exhaust steam line 114 and steam supplied from the intermediate-pressure superheater 34 to the primary reheater 42 via the steam line 68 and the high-pressure exhaust steam line 114 through heat exchange with exhaust gas. The steam superheated by the primary reheater 42 is supplied to the secondary reheater 46 via a steam line 82 connecting the primary reheater 42 and the secondary reheater 46. A desuperheater 83 for reducing the temperature of the steam flowing through the steam line 82 is disposed in the steam line 82.

The secondary reheater 46 further superheats steam supplied via the steam line 82 through heat exchange with exhaust gas. The steam superheated by the secondary repeater 46 is supplied to the intermediate-pressure steam turbine 104 via a steam line 98 connecting the secondary repeater 46 and the steam inlet of the intermediate-pressure steam turbine 104.

Figure 2:
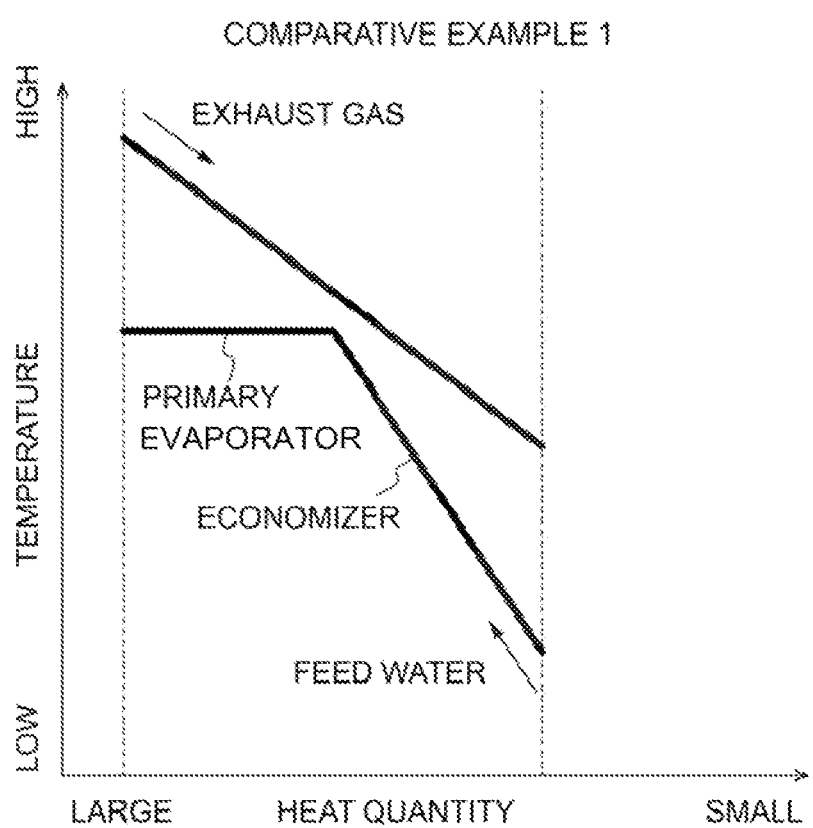
FIG. 2 is a graph showing a line which indicates the relationship between the heat quantity and temperature of feed water from the economizer to the primary evaporator in the steam generation apparatus, and a line which indicates the relationship between the heat quantity and temperature of exhaust gas from the primary evaporator to the economizer. The graph corresponds to a steam generation apparatus (comparative example 1) which includes only one economizer and no flash tank.
Figure 3:
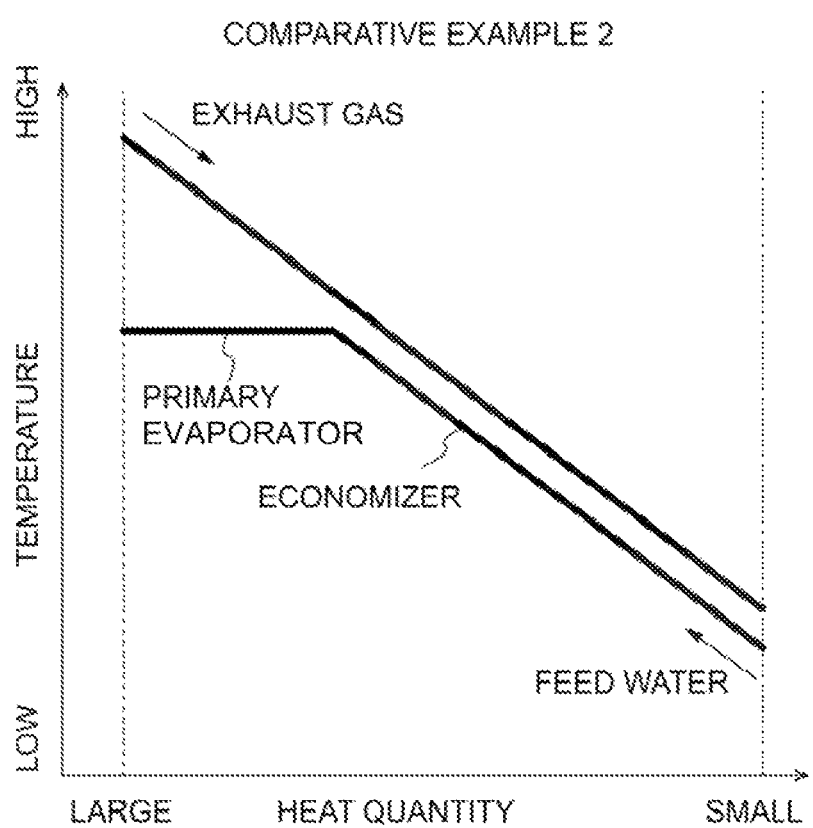
FIG. 3 is a diagram showing a line which indicates the relationship between the heat quantity and temperature of feed water from the economizer to the primary evaporator in the steam generation apparatus, and a line which indicates the relationship between the heat quantity and temperature of exhaust gas from the primary evaporator to the economizer.
Figure 4:
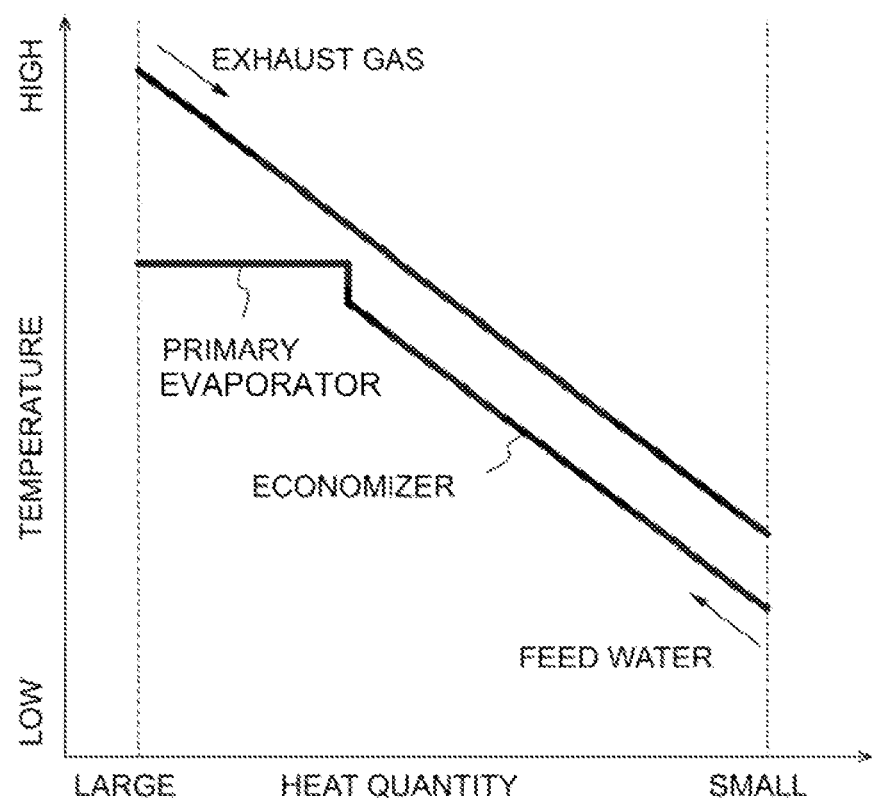
FIG. 4 is a graph showing a line which indicates the relationship between the heat quantity and temperature of feed water from the economizer to the primary evaporator in the steam generation apparatus, and a line which indicates the relationship between the heat quantity and temperature of exhaust gas from the primary evaporator to the economizer. The graph corresponds to a steam generation apparatus (comparative example 3) which includes only one economizer and a flash tank, where the approach temperature difference (the difference between the saturation temperature at the pressure of the primary evaporator and the feed water temperature at the inlet of the primary evaporator) is not zero.
Figure 5:
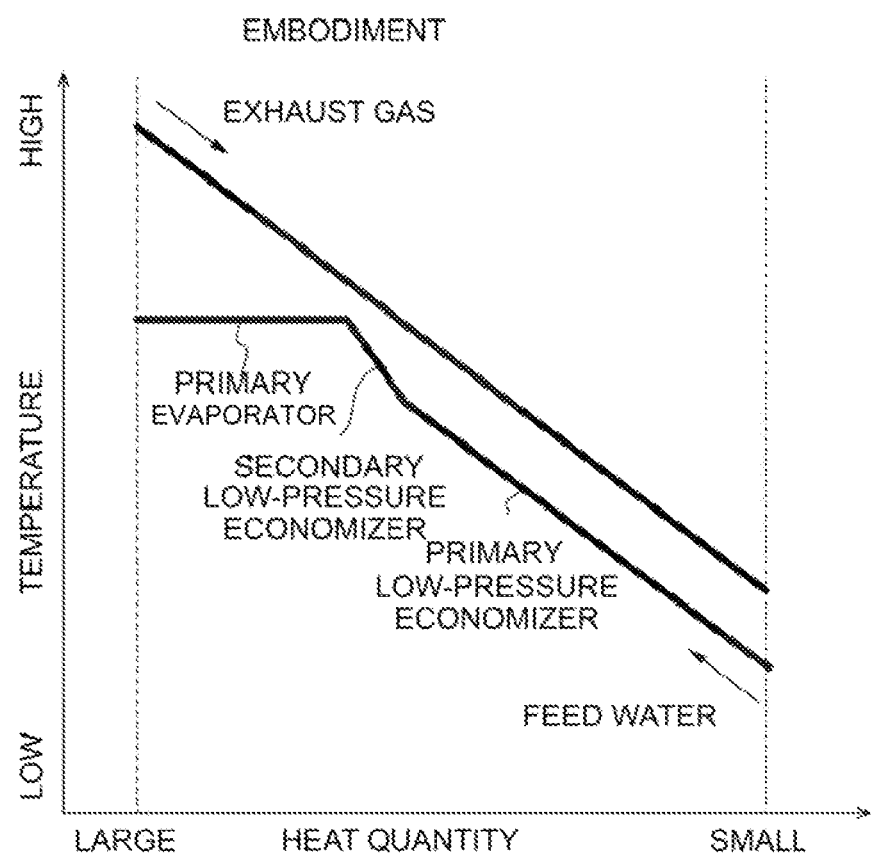
FIG. 5 is a graph showing a line which indicates the relationship between the heat quantity and temperature of feed water from the economizer to the primary evaporator in the steam generation apparatus, and a line which indicates the relationship between the heat quantity and temperature of exhaust gas from the primary evaporator to the economizer. The graph corresponds to a steam generation apparatus 6 according to an embodiment including the primary economizer, the secondary economizer and a flash tank.

The effects achieved by the above-described steam generation apparatus 6 will be described referring to the TQ line graphs shown in FIGS. 2 to 5. FIGS. 2 to 5 are each a graph showing a line which indicates the relationship between the heat quantity and temperature of feed water from the economizer to the primary evaporator in the steam generation apparatus, and a line which indicates the relationship between the heat quantity and temperature of exhaust gas from the primary evaporator to the economizer. FIG. 2 is a graph corresponding to a steam generation apparatus (comparative example 1) including only one economizer and no flash tank. FIG. 3 is a graph corresponding to a steam generation apparatus (comparative example 2) including only one economizer and a flash tank, and configured to let water from the inlet of the primary evaporator flash at the flash tank to recover the ideally maximum heat quantity. FIG. 4 is a graph corresponding to a steam generation apparatus (comparative example 3) including only one economizer and a flash tank, and the approach temperature difference (the difference between the saturation temperature at the pressure of the primary evaporator and the feed water temperature at the inlet of the primary evaporator) is not zero. FIG. 5 is a graph corresponding to the steam generation apparatus 6 according to the above described embodiment including the primary economizer, the secondary economizer, and a flash tank.

In the examples depicted in FIGS. 2, 3, and 5, the approach temperature difference is set to zero in order to enhance the heat utilization efficiency, and the water at the inlet of the evaporator is saturated water (the dryness fraction is 0% at the saturation temperature).

As shown in FIG. 2, in the comparative example 1, since the flash tank is not provided, the heat recovery amount at the heat recovery steam generator 5 is small and exhaust heat is released while still having a high temperature, which means that the heat utilization efficiency is low.

Furthermore, as shown in FIG. 3, in the comparative example 2, the flash flow rate is set such that the slope of the line indicating feed water equals to the slope of the line of exhaust gas in an ideal case where the heat recovery amount is increased to the maximum and the heat utilization efficiency is enhanced. At this time, the heat recover amount is great, and the temperature difference between exhaust gas and feed water at the economizer is small from the inlet to the outlet, which makes it possible to achieve a high heat utilization efficiency. However, the size of the economizer undesirably increases.

Furthermore, as shown in FIG. 4, in the comparative example 3, the flash flow rate is set such that the slope of the line indicating feed water equals to the slope of the line of exhaust gas, and thus it is possible to avoid the heat transmission area of the economizer being unnecessarily large when the feed water temperature at the inlet of the primary evaporator is reduced. At this time, although the heat recovery amount is equivalent to that in the case shown in FIG. 5, a part of heat recovered from exhaust gas by the primary evaporator is used to increase the temperature of feed water from the inlet temperature of the primary evaporator to the saturation temperature at the pressure of the primary evaporator, and thus the heat quantity that can be utilized for evaporation decreases, and the steam of the primary evaporator decreases. Therefore, while the flow rate of flash steam having a lower temperature and a lower pressure increases, steam of the primary evaporator that has a higher pressure and a higher temperature and thus has a high usefulness than the flash steam decreases, Thus, the heat utilization efficiency is lower than that in the case shown in FIG. 5.

In this regard, the steam generation apparatus 6 according to the embodiment illustrated in FIGS. 1 and 5 includes a feed water line 52 which supplies water heated by the primary low-pressure economizer 22 to the secondary low-pressure economizer 24, and a feed water line 53 which is disposed so as to branch from the heated water line 52 and which supplies water heated by the primary low-pressure economizer 22 to the flash tank 8. Thus, the flow rate of the secondary low-pressure economizer 24 is smaller than the flow rate of the primary low-pressure economizer 22 (in FIG. 5, the slope of the line indicating the feed water of the secondary low-pressure economizer is greater than the slope of the line indicating the feed water of the primary low-pressure economizer). Thus, even if the flow rate of the feed water of the primary low-pressure economizer 22 increases in accordance with the flow rate of the feed water supplied to the flash tank 8, it is possible to bring the temperature of the feed water closer to a saturation steam temperature with a high efficiency, using the secondary low-pressure economizer 24 having a relatively small size. Furthermore, since the temperature difference between exhaust gas and feed water is relatively large at the primary low-pressure economizer 22, it is possible to maintain the size to be relatively small even when the flow rate of feed water is increased. Thus, compared to a case where the temperature of feed water is brought closer to a saturation steam temperature using a single economizer, it is possible to enhance the heat utilization efficiency of the heat medium by using the flash tank 8, while suppressing a size increase of the economizer (the total of the size of the primary low-pressure economizer 22 and the size of the secondary low-pressure economizer 24).

(Modified Example of the Combined Cycle Plant 2)

Next, a modified example of the combined cycle plant 2 will be described with reference to FIGS. 6 to 12.

Figure 6:
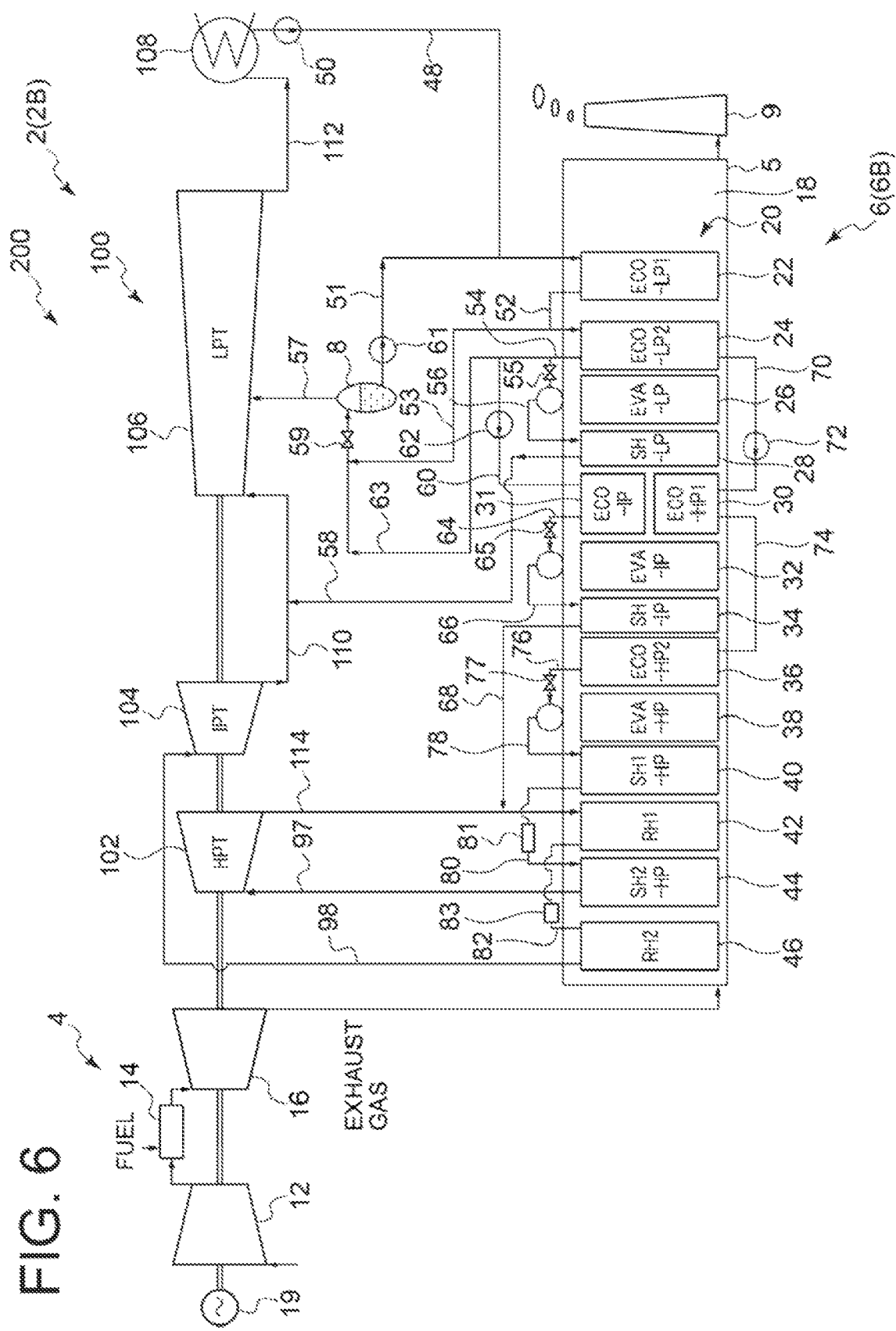
FIG. 6 is a schematic overall configuration diagram of a combined cycle plant 2 (2B) according to another embodiment.
Figure 7:
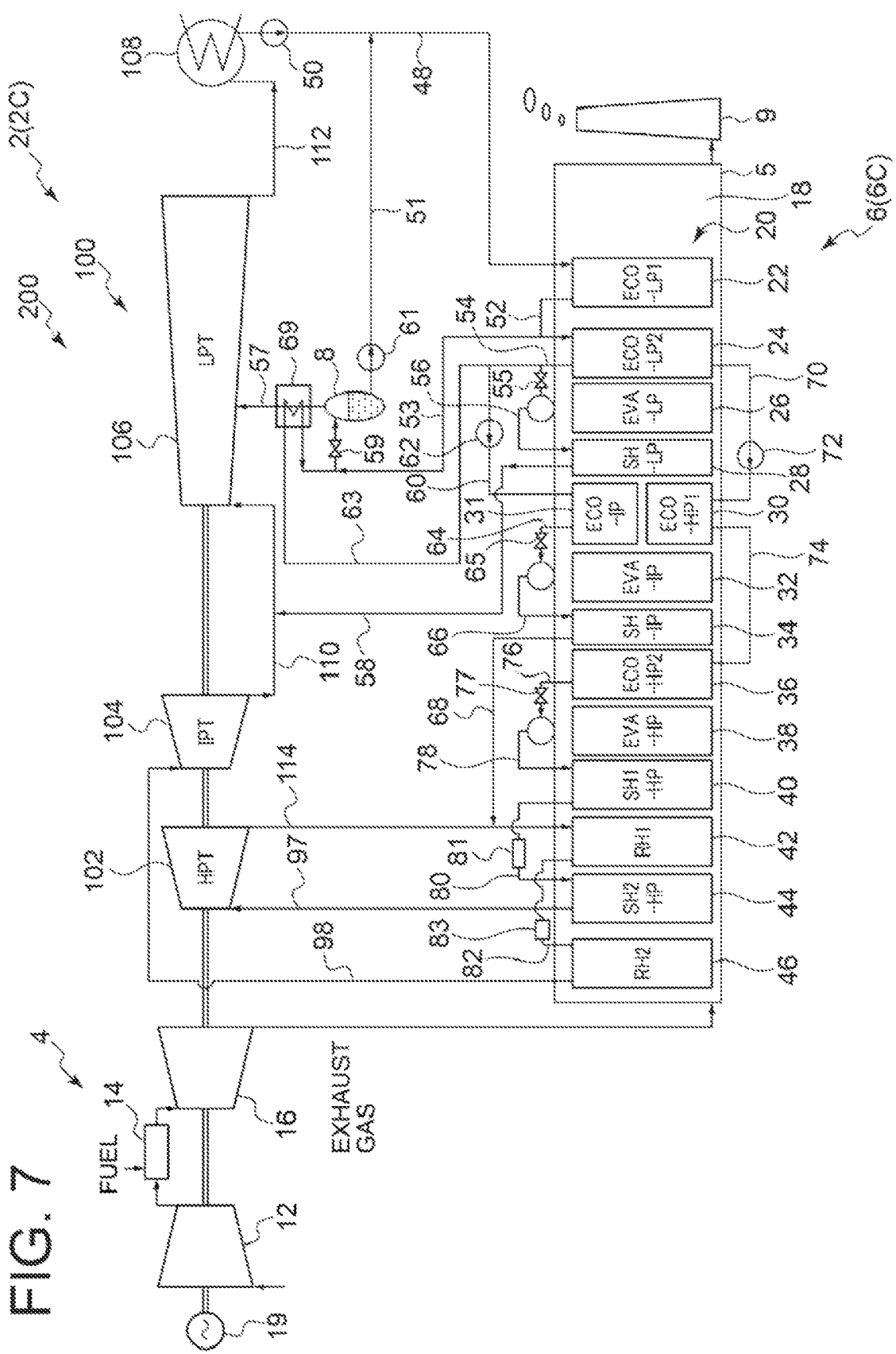
FIG. 7 is a schematic overall configuration diagram of a combined cycle plant 2 (2C) according to another embodiment.

In the combined cycle plant 2 (2A to 2F) according to some embodiments illustrated in FIGS. 6 to 12, reference numerals that are common to respective features of the combined cycle plant 2 depicted in FIG. 1 refer to the same features as those of the steam generation apparatus depicted in FIG. 1 unless otherwise stated, and not described in detail, FIG. 6 is a schematic overall configuration diagram of a combined cycle plant 2 (2B) according to another embodiment. FIG. 7 is a schematic overall configuration diagram of a combined cycle plant 2 (2C) according to another embodiment.

In some embodiments, as illustrated in FIGS. 6 and 7 for example, the steam generation apparatus 6 (6B, 6C) of the combined cycle plant 2 (2B, 2C) further includes a feed water line 63 for supplying water heated by the secondary low-pressure economizer 24 to the flash tank 8. The feed water line 63 is disposed so as to branch from the feed water line 54, and joins the feed water line 53.

Accordingly, it is possible to adjust the flow rate of the secondary low-pressure economizer 24, and obtain a high efficiency with an economizer having an appropriate size. Furthermore, it is possible to maintain the feed water temperature at the outlet of the secondary low-pressure economizer 24, which affects the evaporation amount of the low-pressure evaporator 26 and is especially important, at a high temperature (maintain the approach temperature difference of the low-pressure evaporator 26 close to zero), and maintain the temperature difference between exhaust gas and feed water at the primary economizer 22 to a constant value that is greater than that at the feed water outlet of the primary economizer 22. Herein, when the temperature difference between exhaust gas and feed water is constant, the heat exchange amount is maximized relative to the size. Thus, it is possible to reduce the size of the primary economizer 22 reasonably, and increase the size of only the secondary low-pressure economizer 24, which is especially important in terms of performance, and enhance the efficiency.

In some embodiments, as illustrated in FIG. 7 for example, the steam generation apparatus 6 (6C) of the combined cycle plant 2 (2C) further includes a superheater 69 for superheating steam generated by the flash tank 8. The superheater 69 superheats steam flowing through the steam line 57 by exchanging heat between heated water flowing through the feed water line 63 and steam flowing through the steam line 57. In another embodiment, as illustrated in FIG. 6, the heated water flowing through the feed water line 63 may be supplied directly to the flash tank 8, without passing through the superheater 69.

As illustrated in FIG. 7, by superheating steam flowing through the steam line 57 with the superheater 69 utilizing high-temperature feed water flowing through the feed water line 63, it is possible to utilize steam having a higher temperature than in a case where the steam is not superheated, and thus it is possible to enhance the heat utilization efficiency. Furthermore, with the steam being in a superheated state, it is possible to suppress condensation inside a pipe such as the steam line 57, and suppress occurrence of troubles such as blockage of the pipe due to drain water, for instance. Furthermore, in a case where steam flowing out from the superheater 69 is used in the steam turbine, it is possible to reduce the wetness fraction of the downstream stage of the steam turbine and suppress erosion of the turbine blades, while enhancing the efficiency of the steam turbine. Especially, by generating flash steam utilizing feed water obtained at more than one locations, it is possible to use high-temperature feed water to superheat steam generated by flashing low-temperature water, and thus it is possible to generate a large amount of heated steam that has a high temperature.

Figure 8:
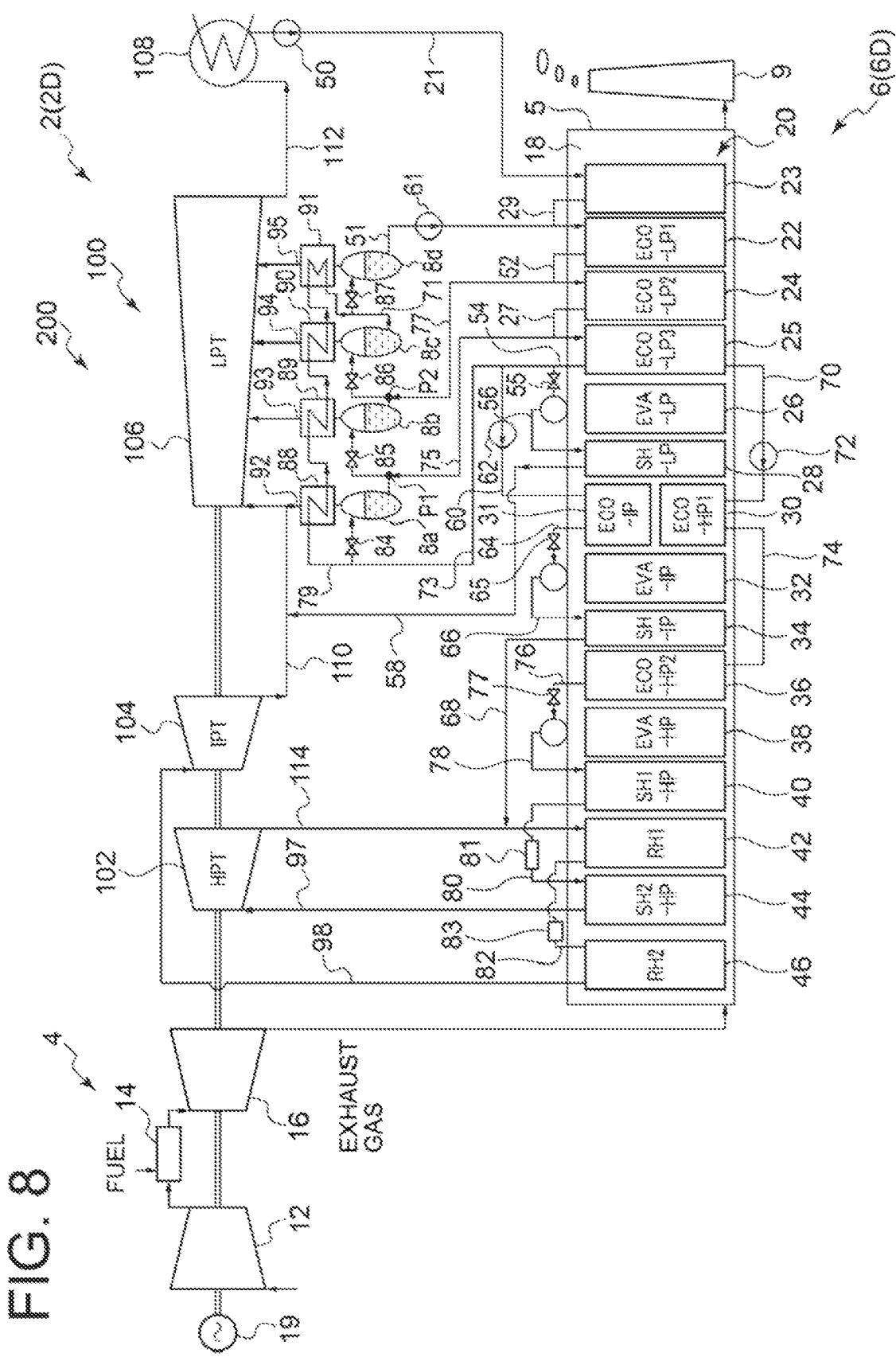
FIG. 8 is a schematic overall configuration diagram of a combined cycle plant 2 (2D) according to another embodiment.

In some embodiments, as illustrated in FIG. 8 for example, the steam generation apparatus 6 (6D) of the combined cycle plant 2 (2D) further includes a low-temperature heat exchanger 23 and the tertiary low-pressure economizer 25. In the embodiment illustrated in FIG. 8, the condenser 108 and the low-temperature heat exchanger 23 are connected via a feed water line 21, and a condenser pump 50 for supplying condensed water discharged from the condenser 108 to the low-temperature heat exchanger 23 is disposed in the feed water line 21.

The low-temperature heat exchanger 23 heats water supplied from the feed water line 21 via heat exchange with exhaust gas. The water heated by the low-temperature heat exchanger 23 is supplied to the primary low-pressure economizer 22 via a feed water line 29 connecting the low-temperature heat exchanger 23 and the primary low-pressure economizer 22. At the low-temperature heat exchanger 23, the temperature of exhaust gas decreases through heat exchange with water, and a part of moisture of the exhaust gas condenses, whereby it is possible to recover a part of released latent heat to the water and enhance the heat utilization efficiency. The low-temperature heat exchanger 23 is made of a material having a high corrosion resistance such as stainless steel, in order to prevent corrosion due to condensed water.

The primary low-pressure economizer 22 heats water supplied from the teed water line 29 through heat exchange with exhaust gas. A part of water heated by the primary low-pressure economizer 22 is supplied to the secondary low-pressure economizer 24 via the feed water line 52 connecting the primary low-pressure economizer 22 and the secondary low-pressure economizer 24.

A part of water heated by the secondary low-pressure economizer 24 is supplied to the tertiary low-pressure economizer 25 via a feed water line 27 connecting the secondary low-pressure economizer 24 and the tertiary low-pressure economizer 25.

The tertiary low-pressure economizer 25 heats water supplied from the secondary low-pressure economizer 24 via the feed water line 27 through heat exchange with exhaust gas. A part of water heated by the tertiary low-pressure economizer 25 is supplied to the low-pressure evaporator 26 via the feed water line 54 connecting the tertiary low-pressure economizer 25 and the low-pressure evaporator 26.

The low-pressure evaporator 26 heats and evaporates water supplied from the tertiary low-pressure economizer 25 via the feed water line 54 through heat exchange with exhaust gas, thereby generating low-pressure steam. A feed water valve 55 for reducing the pressure of water supplied from the tertiary low-pressure economizer 25 is disposed in the feed water line 54. A part of low-pressure steam generated by the low-pressure evaporator 26 is supplied to the low-pressure superheater 28 via the steam line 56 connecting the low-pressure evaporator 26 and the low-pressure superheater 26.

A part of water heated by the tertiary low-pressure economizer 25 is supplied to the intermediate-pressure economizer 31 via the feed water line 60. The feed water line 60 is branched from the feed water line 54 and connected to the intermediate-pressure economizer 31, and the heated water flowing through the feed water line 60 is pressure fed to the intermediate-pressure economizer 31 by the intermediate-pressure feed water pump 62 disposed in the feed water line 60.

The intermediate-pressure economizer 31 heats water supplied from the tertiary low-pressure economizer 25 via the feed water line 60 through heat exchange with exhaust gas. The water heated by the intermediate-pressure economizer 31 is supplied to the intermediate-pressure evaporator 32 via the feed water line 64 connecting the intermediate-pressure economizer 31 and the intermediate-pressure evaporator 32.

In the embodiment illustrated in FIG. 8, the steam generation apparatus 6 (6D) of the combined cycle plant 2 (2D) includes a plurality of flash tanks 8 whose pressures are set to be different from one another, a drain water line 71 connecting the plurality of flash tanks 8a to 8d in series and guiding drain water discharged from the respective flash tanks 8a to 8d, and a plurality of feed water lines 73, 75, 77 which supply water heated by exhaust gas at the heat recovery steam generator 5 to the drain water line 71. The feed water line 73 is branched from the feed water line 54, and connects to the flash tank 8a. The feed water line 75 is branched from the feed water line 27, and joins the drain water line 71 at a position between the flash tank 8a and the flash tank 8b. The feed water line 77 is branched from the feed water line 52, and joins the drain water line 71 at a position between the flash tank 8b and the flash tank 8c.

A pressure reducing valve 84 is disposed in the feed water line 73. A pressure reducing valve 85 is disposed in the drain water line 71 at a position between the flash tank 8a and the flash tank 8b. A pressure reducing valve 86 is disposed in the drain water line 71 at a position between the flash tank 8b and the flash tank 8c. A pressure reducing valve 87 is disposed in the drain water line 71 at a position between the flash tank 8c and the flash tank 8d.

A feed water line 79 branched from the feed water line 73 is connected to the drain water line 71 at a position between the flash tank 8c and the flash tank 8d. A plurality of superheaters 88, 89, 90, 91 are disposed in the feed water line 79.

The flash tank 8a reduces the pressure of heated water supplied from the feed water line 73 and evaporates (flashes) the heated water to generate flash steam. The flash steam generated by the flash tank 8a flows into the intermediate-pressure exhaust steam line 110 via a steam line 92 connecting the flash tank 8a and the intermediate-pressure exhaust steam line 110, and flows into the steam inlet of the low-pressure steam turbine 106 from the intermediate-pressure exhaust steam line 110. A superheater 88 is disposed in the steam line 92, and the steam flowing through the steam line 92 is superheated at the superheater 88 through heat exchange with heated water flowing through the feed water line 79, and then supplied to the low-pressure steam turbine 106.

The flash tank 8b reduces the pressure of drain water discharged from the flash tank 8a and heated water supplied from the feed water line 75 and evaporates (flashes) the drain water and the heated water to generate flash steam. The flash steam generated by the flash tank 8b flows into the low-pressure steam turbine 106 via a steam line 93 connecting the flash tank 8b and the intermediate stage of the low-pressure steam turbine 106. A superheater 89 is disposed in the steam line 93, and the steam flowing through the steam line 93 is superheated at the superheater 89 through heat exchange with heated water flowing through the feed water line 79, and then supplied to the low-pressure steam turbine 106.

The flash tank 8c reduces the pressure of drain water discharged from the flash tank 8b and heated water supplied from the feed water line 77 and evaporates (flashes) the drain water and the heated water to generate flash steam. The flash steam generated by the flash tank 8c flows into the low-pressure steam turbine 106 via a steam line 94 connecting the flash tank 8c and the intermediate stage of the low-pressure steam turbine 106. A superheater 90 is disposed in the steam line 94, and the steam flowing through the steam line 94 is superheated at the superheater 90 through heat exchange with heated water flowing through the feed water line 79, and then supplied to the low-pressure steam turbine 106.

The flash tank 8d reduces the pressure of drain water discharged from the flash tank 8c and heated water supplied from the feed water line 79 and evaporates (flashes) the drain water and the heated water to generate flash steam. The flash steam generated by the flash tank 8d flows into the low-pressure steam turbine 106 via a steam line 95 connecting the flash tank 8d and the intermediate stage of the low-pressure steam turbine 106. A superheater 91 is disposed in the steam line 95, and the steam flowing through the steam line 95 is superheated at the superheater 91 through heat exchange with heated water flowing through the feed water line 79, and then supplied to the low-pressure steam turbine 106.

Herein, with respect to the flow direction of steam in the low-pressure steam turbine 106, the position where the steam line 93 connects to the low-pressure steam turbine 106 is more downstream than the position where the intermediate-pressure exhaust steam line 110 connects to the low-pressure steam turbine 106. Further the position where the steam line 94 connects to the steam turbine 106 is more downstream than the position where the steam line 93 connects to the low-pressure steam turbine 106, Furthermore, the position where the steam line 95 connects to the low-pressure steam turbine 106 is more downstream than the position where the steam line 94 connects to the low-pressure steam turbine 106.

Herein, the temperature Tw1 of water flowing through the feed water line 75 is lower than the saturation temperature Ta corresponding to the pressure Pa of the flash tank 8a, from among the plurality of flash tanks 8a to 8d, positioned at the upstream side of the position P1 where the drain water line 71 and the feed water line 75 connect, with respect to the flow direction of the drain water line 71. Furthermore, the temperature Tw1 of water flowing through the feed water line 75 is higher than the saturation temperature Tb corresponding to the pressure Pb of the flash tank 8b, from among the plurality of flash tanks 8a to 8d, positioned at the downstream side of the position P1 where the drain water line 71 and the feed water line 75 connect, with respect to the flow direction of the drain water line 71.

Furthermore, the temperature Tw2 of water flowing through the feed water line 77 is lower than the saturation temperature corresponding to the pressure of the flash tank 8b, from among the plurality of flash tanks 8a to 8d, positioned at the upstream side of the position P2 where the drain water line 71 and the feed water line 77 connect, with respect to the flow direction of the drain water line 71. Furthermore, the temperature of water flowing through the feed water line 77 is higher than the saturation temperature corresponding to the pressure of the flash tank 8c, from among the plurality of flash tanks 8a to 8d, positioned at the downstream side of the position P2 where the drain water line 71 and the feed water line 77 connect, with respect to the flow direction of the drain water line 71.

Accordingly, when defining the temperature of water of the feed water line 75 as Tw1, the temperature of water of the feed water line 75 as Tw2, the saturation temperature of steam corresponding to the pressure Pa of steam in the flash tank as Ta, the saturation temperature of steam corresponding to the pressure Pb of steam in the flash tank 8b as Tb, the saturation temperature of steam corresponding to the pressure Pc of steam in the flash tank 8c as Tc, and the saturation temperature of steam corresponding to the pressure Pd of steam in the flash tank 8d as Td, an expression Ta>Tw1>Tb>Tw2>Tc>Td is satisfied.

In the configuration illustrated in FIG. 8, a plurality of flash tanks 8a to 8d having different pressures are provided, and feed water from a plurality of locations is fed to locations of the drain water line each having an appropriate temperature corresponding to the temperature of the feed water, whereby it is possible to enhance the heat utilization efficiency. Furthermore, the saturated water of the flash tanks 8a to 8d is sent sequentially to a flash tank 8 having a lower pressure and a lower temperature to be flashed, whereby it is possible to recover heat in accordance with temperature and enhance the heat utilization efficiency.

Figure 9:
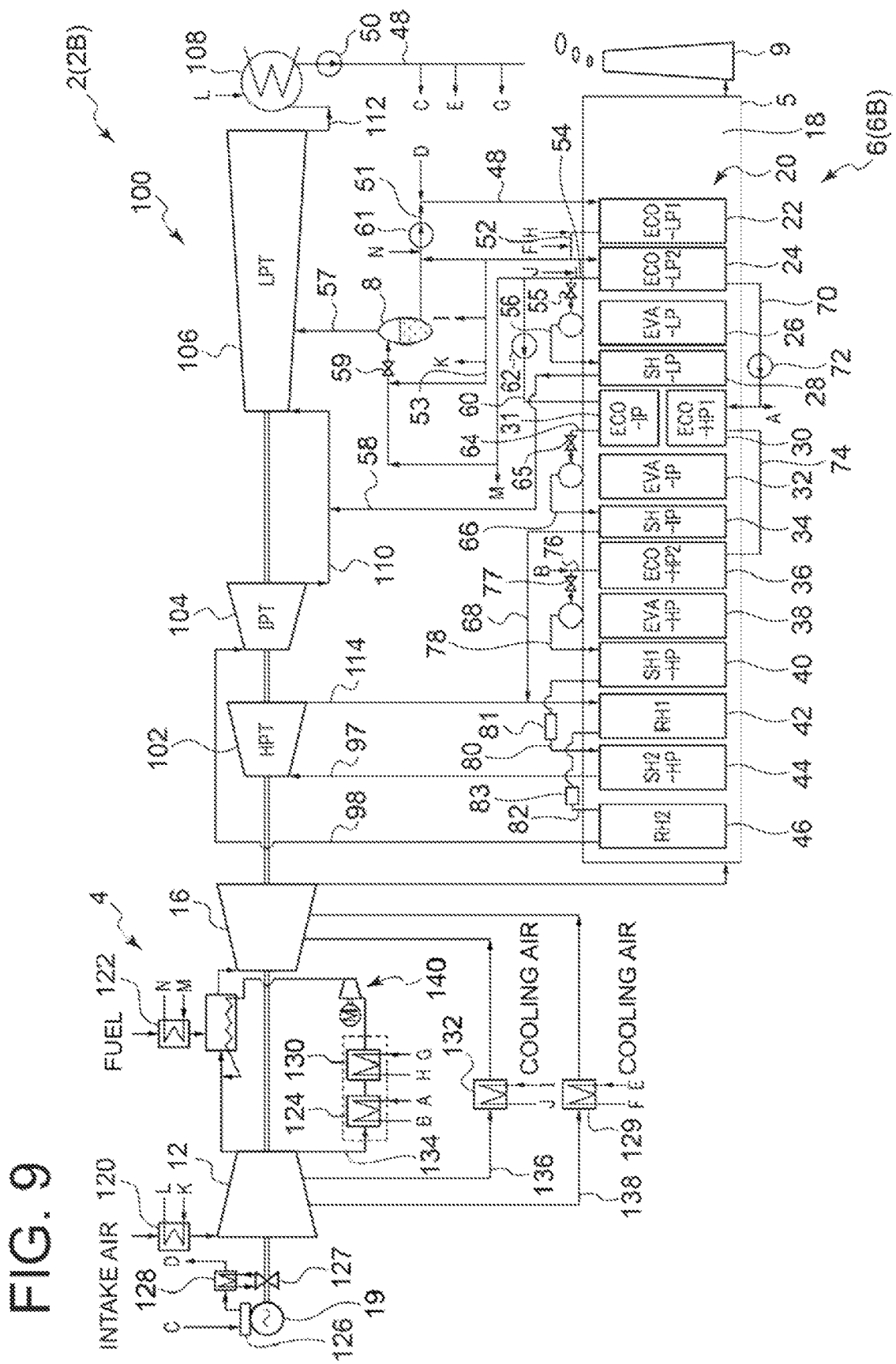
FIG. 9 is a schematic overall configuration diagram of a combined cycle plant 2 (2B) according to another embodiment.

In some embodiments, as illustrated in FIG. 9 for instance, the steam generation apparatus 6 (6B) is configured to utilize, as a heat source, a part of water discharged from the outlet of at least one economizer of the plurality of economizers 22, 24. In the embodiment illustrated in FIG. 9, a part of water discharged from the outlet of the plurality of economizers 22, 24 is supplied, as a heat source, to heat exchangers 120, 122 disposed outside the heat recovery steam generator 5.

A feed water line K branched from the feed water line 53 is connected to the heat exchanger 120 disposed in an intake gas line connecting to the inlet of the compressor 12, and a part of heated water discharged from the outlet of the primary low-pressure economizer 22 is supplied to the heat exchanger 120 through the feed water line K, and heats intake gas of the compressor 12 through heat exchange at the heat exchanger 120. The heated water supplied to the heat exchanger 120 through the feed water line K passes through the heat exchanger 120, and is then returned to the condenser 108 through a feed water line L. In this case, the heat exchanger 120 is a kind of heat utilization facility. By heating intake gas of the compressor 12, it is possible to achieve an effect to prevent condensation and freezing of moisture in the intake gas during operation where the atmospheric temperature is low or the angle of the inlet guide vane (IGV) is narrowed, and an effect to enable low-output operation during a time range when the power demand is low. The temperature of intake gas is around 40° C. at most. Using the inlet feed water of the low-pressure evaporator 26 (primary evaporator) that has a temperature of 140° C. to 180° C. to heat such intake gas means using unnecessarily high-temperature heat, and thus the heat utilization efficiency is low. By using heated water discharged from the outlet of the primary low-pressure economizer 22 having a lower temperature than the inlet feed water of the low-pressure evaporator 26 (primary evaporator) to heat intake gas, it is possible to heat the intake gas effectively utilizing low-temperature heat, and enhance the heat utilization efficiency. Heat over 100° C. is capable of generating steam of ordinary pressure, and thus heat over 100° C. and heat not over 100° C. are considerably different in terms of usefulness. Therefore, if the inlet feed water of the low-pressure evaporator 26 (primary evaporator) having a temperature of 140° C. to 180° C. is used to heat a to-be-heated medium not over 100° C. that is less useful, the usefulness of heat would be impaired significantly. In contrast, when a to-be-heated medium not over 100° C. is heated by using heated water from the outlet of the primary low-pressure economizer 22 having a lower temperature than the inlet feed water of the low-pressure evaporator 26 (primary evaporator), it is possible to improve the heat utilization efficiency without impairing the usefulness of heat significantly.

A feed water line M branched from the feed water line 63 is connected to the heat exchanger 122 disposed in a fuel supply line which supplies a fuel to the combustor 14, and a part of heated water discharged from the outlet of the secondary low-pressure economizer 24 is supplied to the heat exchanger 122 through the teed water line M, and heats the fuel supplied to the combustor 14 through heat exchange at the heat exchanger 122. The heated water supplied to the heat exchanger 122 through the feed water line M passes through the heat exchanger 122, and then flows into the condensed water line 51 through a feed water line N. Accordingly, by appropriately selecting and utilizing heated water from the outlet of an economizer having a temperature close to the necessary temperature for each of the heat exchangers 120, 122, it is possible to enhance the heat utilization efficiency.

In some embodiments, as illustrated in FIG. 9 for instance, the steam generation apparatus 6 (6B) is configured to utilize, as a cooling medium, a part of water flowing through a line for supplying water to the inlet of at least one economizer of the plurality of economizers 22, 24, and recover exhaust heat. In the embodiment illustrated in FIG. 9, a part of water flowing through the lines 48, 53 connecting to the inlet of the economizer 22 is supplied, as a cooling medium, to heat exchangers 124, 126, 128, 129, 130, 132 disposed outside the heat recovery steam generator 5.

A feed water line A branched from the teed water line 70 is connected to the heat exchanger 124. The heat exchanger 124 is disposed in a cooling air line 134 which supplies a part of air compressed by the compressor 12 to the combustor 14 as cooling air, and a part of water discharged from the secondary low-pressure economizer 24 is supplied to the heat exchanger 124 through the feed water line A, and cools the cooling air through heat exchange. The heated water supplied to the heat exchanger 124 through the feed water line A passes through the heat exchanger 124, and then flows into the feed water line 76 through a feed water line B.

A feed water line C branched from the feed water line 48 is connected to a cooling medium cooler 126 for cooling the cooling medium of the generator 19. A part of water flowing through the feed water line 48 is supplied to the cooling medium cooler 126 through the feed water line C, and cools the cooling medium at the cooling medium cooler 126 through heat exchange. The water supplied to the cooling medium cooler 126 through the feed water line C is supplied to a lubricant oil cooler 128 for cooling lubricant oil used for a bearing 127 of the compressor 12, and cools the lubricant oil through heat exchange. The water supplied to the cooling medium cooler 126 passes through the cooling medium cooler, and then returns to the feed water line 48 through a feed water line D and flows into the primary low-pressure economizer 22.

A feed water line E branched from the feed water line 48 is connected to the heat exchanger 129. The heat exchanger 129 is disposed in an extracted air line for supplying air extracted from the compressor 12 to the turbine 16, and a part of water flowing through the feed water line 48 is supplied to the heat exchanger 129 through the teed water line E, and cools the air extracted from the compressor 12 through heat exchange at the heat exchanger 129. The heated water supplied to the heat exchanger 129 through the feed water line E flows into the feed water line 52 through a feed water line F.

A feed water line G branched from the feed water line 48 is connected to the heat exchanger 130. The heat exchanger 130 is disposed in the cooling air line 134 at the downstream side of the heat exchanger 124, and a part of water flowing through the teed water line 48 is supplied to the heat exchanger 130 through the feed water line G, and cools the cooling air through heat exchange at the heat exchanger 130. The heated water supplied to the heat exchanger 130 through the feed water line G passes through the heat exchanger 130, and then flows into the feed water line 52 through a feed water line H. Furthermore, a compressor 140 for compressing cooling air is disposed in the cooling air line 134 at the downstream side of the heat exchanger 130.

A feed water line I branched from the feed water line 53 is connected to the heat exchanger 132. The heat exchanger 132 is disposed in an extracted air line 136 for supplying air extracted from the downstream side of a position of the compressor 12 connecting with the extracted air line 138 to the turbine 16, and a part of water flowing through the feed water line 53 is supplied to the heat exchanger 132 through the feed water line I, and cools the air extracted from the compressor through heat exchange at the heat exchanger 132. The water supplied to the heat exchanger 132 through the feed water line I flows into the feed water line 54 through a feed water line J.

As described above, by utilizing a part of water flowing out from the outlet of at least one economizer of the plurality of economizers 22, 24 as a heat source, it is possible to enhance the heat utilization efficiency of the combined cycle plant 2 as a whole.

Furthermore, by utilizing a part of water flowing through the line for supplying water to the inlet of the at least one economizer of the plurality of economizers 22, 24 as a cooling medium to recover exhaust heat, it is possible to enhance the heat utilization efficiency of the combined cycle plant 2 as a whole.

Moreover, in a case where low-temperature exhaust heat is utilized and recovered at various temperatures as illustrated in FIG. 9, the flow rate of feed water of the feed water line 48 and the feed water lines 52, 53, 63 varies depending on the temperature level, and thus the flow rate of feed water flowing through the primary low-pressure economizer 22 and the secondary low-pressure economizer 24 changes. As a result, the slope of the TQ line graph (see FIG. 5, for example) is not preferable in terms of reduction of the size of the low-pressure economizer. Herein, by adjusting the amount of water used in flashing for each temperature level using the pressure reducing valve 59 for instance to adjust the flow rate of feed water flowing through the primary low-pressure economizer 22 and the secondary low-pressure economizer 24, the slope of the TQ line graph of the feed water flowing through the primary low-pressure economizer 22 is brought closer to the slope of the TQ line graph of exhaust gas, and the feed water outlet temperature of the secondary low-pressure economizer 24 is brought closer to the saturation temperature at the working pressure of the low-pressure evaporator 26 (primary evaporator) (the approach temperature difference is brought closer to zero). Accordingly, it is possible to achieve a high efficiency with the economizers 22, 24 having a relatively small size.

Figure 10:
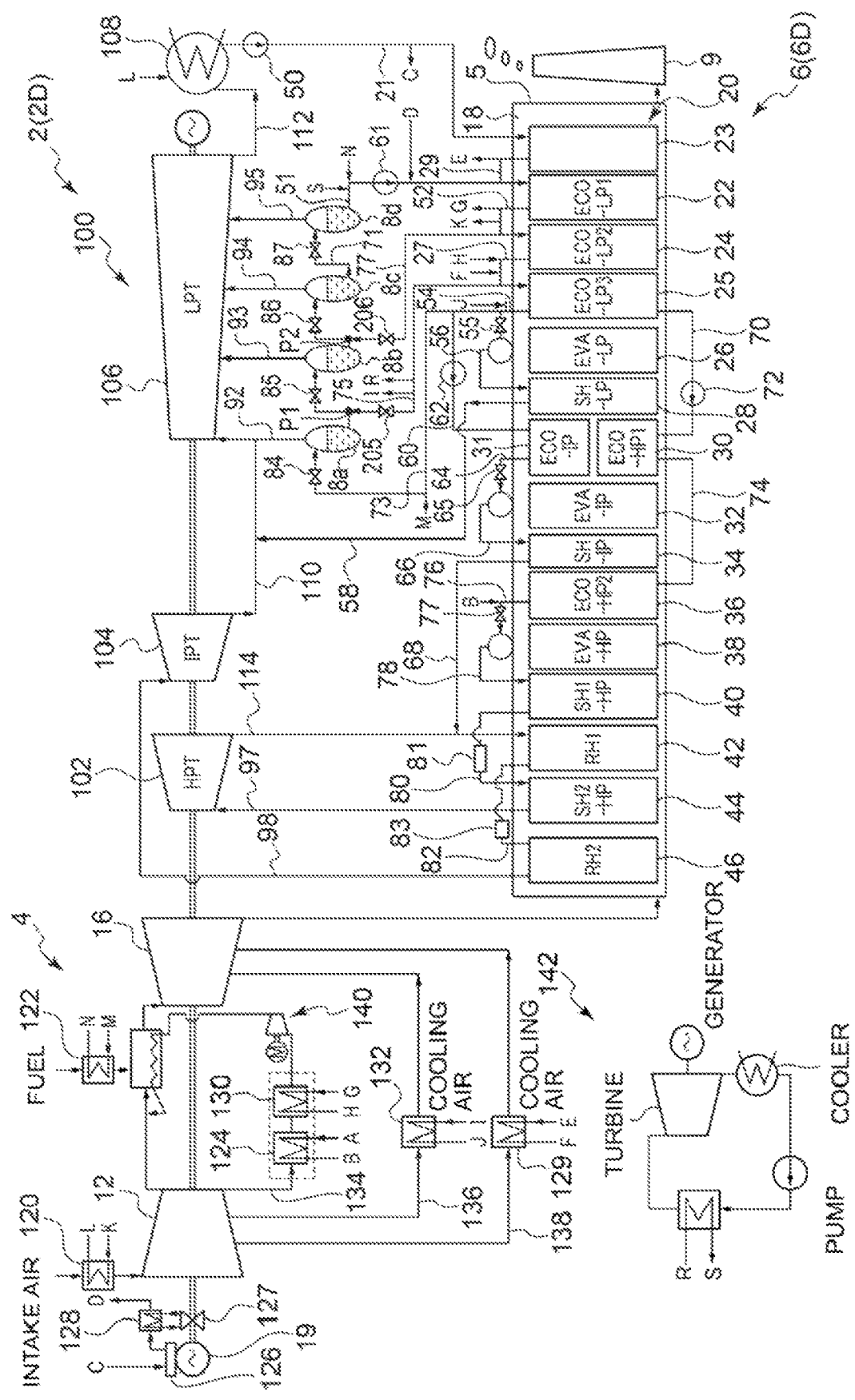
FIG. 10 is a schematic overall configuration diagram of a combined cycle plant 2 (2D) according to another embodiment.

In some embodiments, the configuration of the combined cycle plant 2 (2B) for utilizing feed water as a heat source or a cooling medium described with reference to FIG. 9 may be applied to the combined cycle plant 2 (2I)) including the above described plurality of flash tanks 8a to 8d (multi-stage flash as illustrated in FIG. 10. As illustrated in FIG. 10, when the configuration of multi-stage flash is applied and feed water is recovered and flashed at a location where the saturation temperature is close to the temperature of the feed water, it is possible to achieve an even higher efficiency. In this case, it is possible to enhance the heat utilization efficiency and thus preferable if the feed water used as a heat source or a cooling medium is obtained from a corresponding location having a desired temperature, from among the feed water line 21 connecting the condenser 108 and the low-temperature heat exchanger 23 and positions between the respective heat exchangers 20, that is, the feed water outlet of the low-temperature heat exchanger 23, the feed water outlet of the primary low-pressure economizer 22, the feed water outlet of the secondary low-pressure economizer 24, and the feed water outlet of the tertiary low-pressure economizer 25 (feed water inlet of the low-pressure evaporator 26 (primary evaporator)), and used feed water is recovered to a location having the highest temperature of the above locations.

Figure 13:
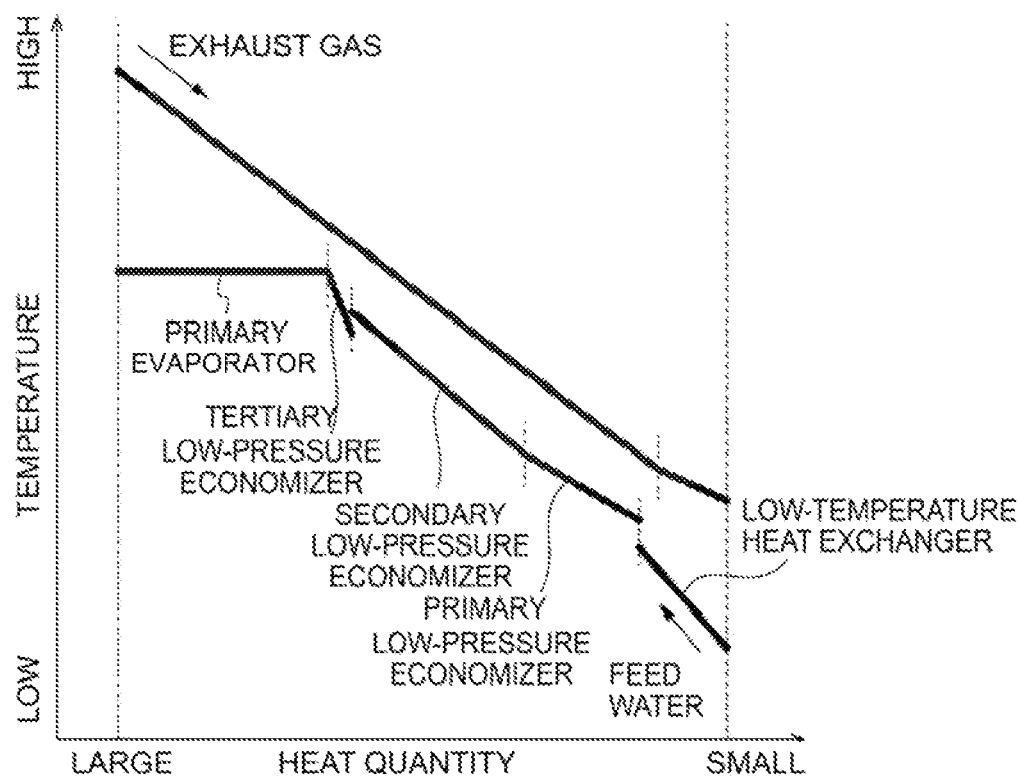
FIG. 13 is a graph showing a line which indicates the relationship between the heat quantity and temperature of feed water from a low-temperature heat exchanger to the primary evaporator in the steam generation apparatus, and a line which indicates the relationship between the heat quantity and temperature of exhaust gas from the primary evaporator to the low-temperature heat exchanger. The graph corresponds to a steam generation apparatus 6 according to an embodiment including a low-temperature heat exchanger, the primary economizer, the secondary economizer, the tertiary economizer, and a flash tank.

FIG. 13 shows a TQ line graph corresponding to FIG. 10. In FIG. 13, feed water is supplied from the right side, and passes through the low-temperature heat exchanger (23 in FIG. 10), the primary low-pressure economizer (22 in FIG. 10, the tertiary economizer), the secondary low-pressure economizer (24 in FIG. 10, the primary economizer), and the tertiary low-pressure economizer (25 in FIG. 10, the secondary economizer) in this order to be heated, and is supplied to the low-pressure evaporator (26 in FIG. 10, the primary evaporator) through the feed water line 54 (sixth feed water line) configured to supply feed water to the low-temperature evaporator 26 (primary evaporator) from the tertiary low-pressure economizer (25 in FIG. 2, the secondary economizer) without letting the feed water exchange heat with a heating medium (exhaust gas). The low-temperature heat exchanger (23 in FIG. 10) is supplied with feed water. The feed water acquisition line E acquires a part of feed water flowing out from the low-temperature heat exchanger (23 in FIG. 10) as feed water which serves as a cold source of the cooling air cooler 129 being a heat utilization facility that cools cooling air which is a to-be-cooled medium. Furthermore, feed water discharged from the low-temperature heat exchanger (23 in FIG. 10) and supplied to the primary low-pressure economizer (22 in FIG. 10, the tertiary economizer) is mixed with condensed water from the flash tank 8d via the condensed water line (feed water supply line) 51 and the feed water pump 61.

In the present embodiment, the condensed water has a higher temperature than the water at the outlet of the low-temperature heat exchanger (23 in FIG. 10). Thus, in the TQ line graph (see FIG. 13), the feed water at the inlet of the primary low-pressure economizer (22 in FIG. 10, the tertiary economizer) has a higher temperature than the feed water at the outlet of the low-temperature heat exchanger (23 in FIG. 10). Furthermore, in the low-temperature heat exchanger (23 in FIG. 10), a part of moisture in exhaust gas is condensed midway and latent heat is released. Thus, the slope of the TQ line graph of exhaust gas at the downstream side with respect to exhaust gas is small. Furthermore, condensed water is added to the primary low-pressure economizer (22 in FIG. 10, the tertiary economizer), and thus the flow rate of feed water is higher at the primary low-pressure economizer (22 in FIG. 10, the tertiary economizer) than at the low-temperature heat exchanger (23 in FIG. 10). Thus, the slope of the TQ line graph of feed water of the primary low-pressure economizer (22 in FIG. 10, the tertiary economizer) is smaller than that of the low-temperature heat exchanger (23 in FIG. 10).

A part of feed water at the outlet of the primary low-pressure economizer (22 in FIG. 10, the tertiary economizer) is obtained by the feed water acquisition line K as feed water which serves as a heat source of the heat exchanger 120 being a heat utilization facility which heats intake air of the compressor 12 of the gas turbine 4, and is obtained by the feed water acquisition line G as teed water which serves as a cold source of the cooling air cooler 130 for cooling the cooling air of the combustor of the gas turbine 4 and recovers exhaust heat. Furthermore, a part of feed water at the outlet of the primary low-pressure economizer (22 in FIG. 10, the tertiary economizer) is sent to the flash tank 8c via the feed water line (feed water acquisition line) 77. Due to acquisition of the above water, the flow rate of feed water flowing through the secondary low-pressure economizer (24 in FIG. 10, the primary economizer) is lower than that of the primary low-pressure economizer (22 in FIG. 10, the tertiary economizer), and the slope of the TQ line graph of feed water of the secondary low-pressure economizer (24 in FIG. 10, the primary economizer) is greater than that of the primary low-pressure economizer (22 in FIG. 10, the tertiary economizer).

The feed water at the outlet of the secondary low-pressure economizer (24 in FIG. 10, the primary economizer), that is, at the inlet of the tertiary low-pressure economizer (25 in FIG. 10, the secondary economizer), is mixed with feed water after being utilized as a cold source at the cooling air coolers 129,130 being heat utilization facilities and recovering exhaust heat via the feed water supply lines F, H, and is also acquired by the feed water acquisition line I as a cold source of the cooling air cooler 132 being a heat utilization facility and supplied to a fuel pre-heater 122 being a heat utilization facility as a heat source via the feed water acquisition line M. In the present example, feed water is mixed through the feed water supply line, and thus the feed water temperature of the inlet of the tertiary low-pressure economizer (25 in FIG. 10, the secondary economizer) is slightly lower than the temperature of feed water of the outlet of the secondary low-pressure economizer (24 in FIG. 10, the primary economizer) (FIG. 13). Herein, the temperature of the cooling air being a to-be-cooled medium is higher at the cooling air cooler 132 than at the cooling air coolers 129, 130, and thus the cooling air cooler 132 where the to-be-cooled medium has a high temperature is supplied with feed water having a higher temperature as a cold source than the cooling air coolers 129, 130 where the to-be-cooled medium has a low temperature. Accordingly, it is possible to recover exhaust heat of a cooling air cooler, that is, a heat utilization facility, to a cooling medium having a closer temperature and utilize the exhaust heat effectively, thereby enhancing the heat utilization efficiency.

As described above, for the feed water at the outlet of the secondary low-pressure economizer (24 in FIG. 10, the primary economizer), that is, at the inlet of the tertiary low-pressure economizer (25 in FIG. 10, the secondary economizer), various feed water acquisition lines and feed water supply lines are provided to receive and send various kinds of feed water. In the present embodiment, the amount of feed water obtained from the outlet of the secondary low-pressure economizer (24 in FIG. 10, the primary economizer), that is, from the inlet of the tertiary low-pressure economizer (25 in FIG. 10, the secondary economizer), is greater than the amount of feed water supplied thereto. Accordingly, the mass flow rate of teed water flowing through the tertiary low-pressure economizer (25 in FIG. 10, the secondary economizer) is lower than the mass flow rate of feed water flowing through the secondary low-pressure economizer (24 in FIG. 10, the primary economizer), and the slope of the TQ line graph of the tertiary low-pressure economizer (25 in FIG. 10, the secondary economizer) is greater than the slope of the TQ line graph of the secondary low-pressure economizer (24 in FIG. 10, the primary economizer). By realizing such slope of the TQ line graph, at the secondary low-pressure economizer (24 in FIG. 10, the primary economizer), the slope of the TQ line graph of the feed water becomes closer to the slope of the TQ line graph of exhaust gas, and thereby it is possible to maintain the temperature difference between exhaust gas and feed water to a nearly constant appropriate temperature difference.

Furthermore, since the flow rate of the tertiary low-pressure economizer (25 in FIG. 10, the secondary economizer) is small and the slope of the TQ line graph is large, the tertiary low-pressure economizer (25 in FIG. 10, the secondary economizer) is capable of supplying water having a temperature close to the saturation temperature (the horizontal line in FIG. 13) corresponding to the steam pressure of the low-pressure evaporator 26 (the primary evaporator) to the low-pressure evaporator 26 (the primary evaporator), and is also capable of ensuring a sufficient temperature difference between exhaust gas (heat medium) and feed water at a heat exchanger (economizer) disposed at the downstream side with respect to the flow direction of the heat medium. Thus, it is possible to realize a relatively high heat utilization efficiency with a small-sized heat exchanger (economizer).

Furthermore, it is more preferable that the mass flow rate of teed water flowing through the tertiary low-pressure economizer (25 in FIG. 10, the secondary economizer) is lower than the mass flow rate of feed water flowing through the primary low-pressure economizer (22 in FIG. 10, the tertiary economizer), and the slope of the TQ line graph the feed water of the tertiary low-pressure economizer (25 in FIG. 10, the secondary economizer) is larger than the slope of the TQ line graph of the feed water of the primary low-pressure economizer (22 in FIG. 10, the tertiary economizer). With the above configuration, it is possible to maintain the temperature difference between exhaust gas and feed water to a nearly constant appropriate temperature difference to the downstream side with respect to the heat medium (exhaust gas), and it is possible to achieve a high heat utilization efficiency with a smaller-sized heat exchanger (economizer). Furthermore, it is even more preferable that the flow rate of feed water of the tertiary low-pressure economizer (25 in FIG. 10, the secondary economizer) is smaller than that of all economizers (heat exchangers) at the downstream side with respect to the heat medium (exhaust gas). In this case, it is possible to obtain a high heat utilization efficiency with a heat exchanger (economizer) of an even smaller size.

Furthermore, as described above, by providing a plurality of economizers including the secondary low-pressure economizer (24 in FIG. 10, the primary economizer) and the tertiary low-pressure economizer (25 in FIG. 10, the secondary economizer) at the downstream side of the low-pressure evaporator (26, the primary evaporator) with respect to the flow direction of the heat medium in the flow passage of the heat medium (exhaust gas), and providing at least one of a feed water acquisition hue which acquires a part of water discharged from the outlet of at least one of the plurality of economizers or a feed water supply line which supplies feed water to the inlet of one of the plurality of economizers, it is possible to adjust the flow rate of the feed water of the previous and subsequent economizers through acquisition and supply of feed water, and realize the preferable slope of the TQ line graph as described above, thereby realizing a relatively high heat utilization efficiency with a small-sized heat exchanger (economizer). Especially, by providing at least one of two or more feed water acquisition lines which acquire a part of water discharged from the outlets of different economizers respectively or two or more feed water supply lines which supply feed water to the inlet of different economizers respectively, it is possible to acquire feed water from a location of an appropriate temperature suitable for usage in a heat utilization facility which utilizes the feed water, or supply feed water to a location of a near temperature. Thus, it is possible to enhance heat utilization efficiency and improve the efficiency of the plant. Furthermore, when both of the feed water acquisition lines and the feed water supply lines are provided, it is possible to enhance the heat utilization efficiency and improve the efficiency of the plant more effectively.

Furthermore, it is preferable that the feed water supply line supplies feed water having a lower temperature than that at the feed water outlet of the economizer Whose feed water inlet is the recipient of the feed water from the feed water supply line, and a higher temperature than that at the feed water inlet of the economizer disposed downstream of the economizer whose feed water inlet is the recipient of the feed water from the feed water supply line, with respect to the flow direction of the heat medium (exhaust gas). With the above configuration, it is possible to reduce the temperature difference between the feed water at a mixing location and the feed water to be supplied. Accordingly, it is possible to reduce the temperature difference between the feed water inlet temperature of the economizer whose feed water inlet is the recipient of the feed water, and the feed water outlet temperature of the economizer disposed, by connecting the feed water line, at the downstream side with respect to the flow direction of the heat medium (exhaust gas) (the upstream side with respect to the flow direction of the feed water). For instance, in the embodiment illustrated in FIGS. 10 and 13, when the temperature of feed water supplied through the feed water supply lines F, H is lower than feed water outlet temperature of the tertiary low-pressure economizer (25 in FIG. 10, the secondary economizer) and higher than the feed water inlet temperature of the secondary low-pressure economizer (24 in FIG. 10, the primary economizer), the temperature of feed water supplied by the feed water supply lines F, H is closer to the temperature of feed water flowing between the tertiary low-pressure economizer (25 in FIG. 10, the secondary economizer) and the secondary low-pressure economizer (24 in FIG. 10, the primary economizer), and it is possible to reduce the temperature difference between the feed water outlet of the secondary low-pressure economizer (24 in FIG. 10, the primary economizer) and the feed water inlet of the tertiary low-pressure economizer (25 in FIG. 10, the secondary economizer).

Therefore, in the TQ line graph (FIG. 13), it is possible to reduce the temperature difference between the left end (corresponding to the feed water outlet) of the line corresponding to the feed water of the secondary low-pressure economizer (24 in FIG. 10, the primary economizer) and the right end (corresponding to the feed water inlet) of the line corresponding to the feed water of the tertiary low-pressure economizer (25 in FIG. 10, the secondary economizer), and it is possible to bring the temperature differences between the heat medium (exhaust gas) and the feed water at the feed water outlet of the secondary low-pressure economizer (24 in FIG. 10, the primary economizer) and the feed water inlet of the tertiary low-pressure economizer (25 in FIG. 10, the secondary economizer) to close values, and thus it is possible to achieve a high heat utilization of with a small-sized heat exchanger (economizer).

Furthermore, a part of feed water at the outlet of the secondary low-pressure economizer (24 in FIG. 10, the primary economizer) is sent to the flash tank 8b via the feed water line 73, and steam generated by boiling the feed water under reduced pressure is supplied to the intermediate stage of the low-pressure steam turbine to extract motive power. Furthermore, a part of feed water at the outlet of the secondary low-pressure economizer (24 in FIG. 10, the primary economizer) is sent to a low-boiling point medium Rankine cycle 142, and heats a low-boiling point medium (e.g., pentane, cyclohexane, R245fa, or the like) which circulates inside the low-boiling point medium Rankine cycle 142. The heated low-boiling point medium evaporates, drives the turbine, and generates motive power. As described above, a set of the flash tanks 8a to 8d and the low-pressure steam turbine 106 and the low-boiling point medium Rankine cycle 142 are disposed in the heat medium flow passage through which exhaust gas (heat medium) flows, and feed water acquired from at least one of the feed water acquisition lines for acquiring feed water between the plurality of heat exchangers (economizers) for heating feed water is sent to a motive power generation apparatus, and the motive power generation apparatus generates motive power using the received feed water.

With the above configuration, it is possible to utilize heat of feed water effectively to extract motive power, and thereby enhance the efficiency of the plant. In addition, the pressure reducing valve 84 and the flow control valves 205, 206 are used to adjust the flow rate of each of the feed water lines (feed water acquisition lines) 73, 75, 77, and the feed water outlet temperature of the tertiary low-pressure economizer 25 is brought closer to the saturation temperature at the working pressure of the low-pressure evaporator 26 (the primary evaporator) (bring the approach temperature difference closer to zero), and the flow rates of the secondary low-pressure economizer 24 and the tertiary low-pressure economizer 25 are adjusted so that the slope of the TQ line graph of the feed water of each of the secondary low-pressure economizer 24 and the tertiary low-pressure economizer 25 is close to the slope of the TQ line graph of exhaust gas. When the flow rate of the feed water lines (feed water acquisition lines) 73, 75, 77 is increased, the feed water flow rate of the economizers upstream of the respective branch points with respect to the flow direction of feed water, that is, the tertiary low-pressure economizer 25, the secondary low-pressure economizer 24, and the primary low-pressure economizer 22 increases, and the slope of the TQ line graph decreases.

Conversely, the slope of each TQ line graph can be increased by reducing the flow rate of corresponding one of the feed water lines 73, 75, 77. Accordingly, it is possible to bring the temperature of the feed water inlet (the tertiary low-pressure economizer 25) (teed water inlet of the low-pressure evaporator 26) closer to the saturation temperature corresponding to the working pressure of the low-pressure evaporator 26, and bring the slope of the TQ line graph of feed water of the primary low-pressure economizer 22 and the secondary low-pressure economizer 24 closer to the slope of the TQ diagram of exhaust gas, thereby enhancing the heat utilization efficiency with a relatively small-sized economizer. It should be noted that the configuration of the low-boiling point medium Rankine cycle 142 according to the present embodiment is merely an example, and low-boiling point medium Rankine cycles of various configurations may be adopted. Japanese Patent Publication JP2015-183595 discloses such various configurations. By referring to this publication, a person of ordinary skill in the art would be able to apply various configurations.

For the heat utilization facilities inside the plant excluding the motive power generation apparatus, such as the intake air heater 120 of the gas turbine, the cooling air coolers 129, 130, 132, and the fuel pre-heater 122, the flow rate of feed water that serves as a necessary heat source or cold source is determined on the basis of the necessity of heating or cooling, and cannot be set freely. Meanwhile, the temperature and flow rate of feed water that serves as a heat source of a motive power generation apparatus may be flexibly set, and the motive power generation apparatus is capable of generating motive power in accordance with the temperature and the flow rate of the supplied feed water. Thus, with the motive power generation apparatus provided as in the present embodiment, even in a case where it is necessary to supply feed water having a necessary temperature and a necessary flow rate for the various heat utilization facilities in the plant, by changing the flow rate of feed water supplied to the motive power generation apparatus and the acquisition position between the economizers, it is possible to improve the flow rate distribution of feed water flowing through the plurality of economizers as described above, bring the feed water temperature of the inlet of the low-pressure evaporator (the primary evaporator 26) closer to the saturation temperature corresponding to the steam pressure of the low-pressure evaporator (the primary evaporator 26), and maintain the temperature difference between the heat median (exhaust gas) and the teed water at each part, thereby achieving a high heat utilization efficiency with a small-sized heat exchanger (economizer).

Furthermore, in some embodiments, as depicted in FIG. 1, the entire amount of water heated by the secondary economizer 24 is sent to at least one of the low-pressure evaporator 26 (the primary evaporator), or a high-temperature heal exchanger which heats the feed water to a temperature higher than the saturation temperature corresponding to the steam pressure of the low-pressure evaporator 26 (the primary evaporator). In FIG. 1, the water heated by the secondary economizer 24 is entirely sent to one of the low-pressure evaporator 26 (primary evaporator), the intermediate-pressure economizer 31, or the primary high-pressure economizer 30, and not supplied to a heat utilization facility other than the above. To the intermediate-pressure economizer 31 and the primary high-pressure economizer 30, feed water is pumped by the intermediate-pressure feed water pump 62 and the high-pressure feed water pump 72, respectively. The feed water is pressurized at the intermediate-pressure economizer 31 and the primary high-pressure economizer 30, and thus does not boil at the saturation temperature corresponding to the steam pressure of the low-pressure evaporator 26 (the primary evaporator), and is heated to a higher temperature while still remaining in the liquid phase. The feed water having a temperature increased by the intermediate-pressure economizer 31 and the primary high-pressure economizer 30 are evaporated by the intermediate-pressure evaporator 32 and the high-pressure evaporator 38, respectively, and finally drives the steam turbine to generate motive power.

By not sending the feed water healed by the secondary economizer 24 which directly sends feed water to the low-pressure evaporator 26 (the primary evaporator) to various heat utilization facilities used for heat utilization of a relatively low temperature but limitedly sending the feed water to the low-pressure evaporator 26 (the primary evaporator), the intermediate-pressure economizer 31 and the primary high-pressure economizer 30 which heat the feed water to a temperature higher than the saturation temperature corresponding, to the steam pressure of the low-pressure evaporator 26 (the primary evaporator), it is possible to reduce the flow rate of feed water heated by the secondary economizer 24. Accordingly, it is possible to bring the temperature distribution of feed water flowing through the economizer closer to the above-described preferable temperature distribution, increase the slope of the line corresponding to feed water of the secondary economizer 24 on the TQ line graph, bring the temperature of feed water supplied to the low-pressure evaporator 26 (the primary evaporator) closer to the saturation temperature corresponding to the steam pressure of the low-pressure evaporator 26 (the primary evaporator), and enhance the heat utilization efficiency. In this case, feed water having a relatively low temperature is acquired from between the economizers and sent to the various heat utilization facilities used in heat utilization of a relatively low temperature (feed water line 53).

Furthermore, in some embodiments, as illustrated in FIG. 10, a part of air at the outlet of the compressor 12 of the gas turbine 4 is acquired as cooling air which cools the combustor of the gas turbine 4. The cooling air is cooled and the temperature of the cooling air is reduced at the heat exchanger 130 in order to reduce the motive power of the compressor 140 which sends the cooling air to the combustor and enhance the cooling effect to cool the combustor. Meanwhile, a part of feed water at the outlet of the primary low-pressure economizer 22 is supplied to the heat exchanger 130 as a cooling medium. The heat exchanger 130 exchanges heat between the cooling air and the feed water to cool the cooling air and heat the feed water. That is, the heat exchanger 130 is a heat utilization facility which utilizes feed water as a cold source. Also, the cooling air is a kind of to-be-cooled medium.

The temperatures of the cooling air at the inlet and the outlet of the heat exchanger 130 are 180° C. and 90° C., respectively, and the temperatures of the inlet and the outlet of the heat exchanger 130 are for instance 80° C. and 130° C., respectively. Herein, heat over 100° C. is capable of generating steam of ordinary pressure, and thus heat over 100° C. and heat having not over 100° C. are considerably different in terms of usefulness. Thus, as in the present example, by utilizing exhaust heat from reduction of the temperature of the cooling air effectively to heat water at the outlet of the economizer having a temperature not higher than 100° C. to a temperature higher than 100° C., it is possible to recover useful heat, and enhance the heat utilization efficiency in particular.

Furthermore, in this case, to obtain a sufficient cooling effect at the combustor, it is necessary to cool the cooling air being a to-be-cooled medium to a temperature lower than the saturation temperature (e.g., 150° C.) at the steam pressure of the low-pressure evaporator 26 (the primary evaporator) at the heat exchanger 130. For instance, in a hypothetical case where only a single heat exchanger 20 is provided, water at the inlet or the outlet of the single heat exchanger 20 would be used to cool the to-be-cooled medium. With the single heat exchanger 20, the temperature of the feed water outlet is close to the saturation temperature at the steam pressure of the low-pressure evaporator 26 (the primary evaporator), and thus it is not possible to cool the to-be-cooled medium to a sufficiently low temperature, and it would be necessary to use the feed water at the inlet of the heat exchanger 20 for cooling. Thus, exhaust heat at the time of cooling the to-be-cooled medium is recovered by the low-temperature feed water, which makes it difficult to effectively recover exhaust heat, and thus the heat utilization efficiency is low.

Therefore, as in the present disclosure, when a plurality of heat exchangers 20 are provided and feed water is acquired from between the heat exchangers 20 to be used in heat recovery, even in a case where the cooling medium needs to be cooled to a temperature lower than the saturation temperature (e.g., 150° C.) at the steam pressure of the low-pressure evaporator 26 (the primary evaporator), it is possible to recover exhaust heat with feed water having an appropriate temperature, and it is possible to recover exhaust heat efficiently.

Figure 11:
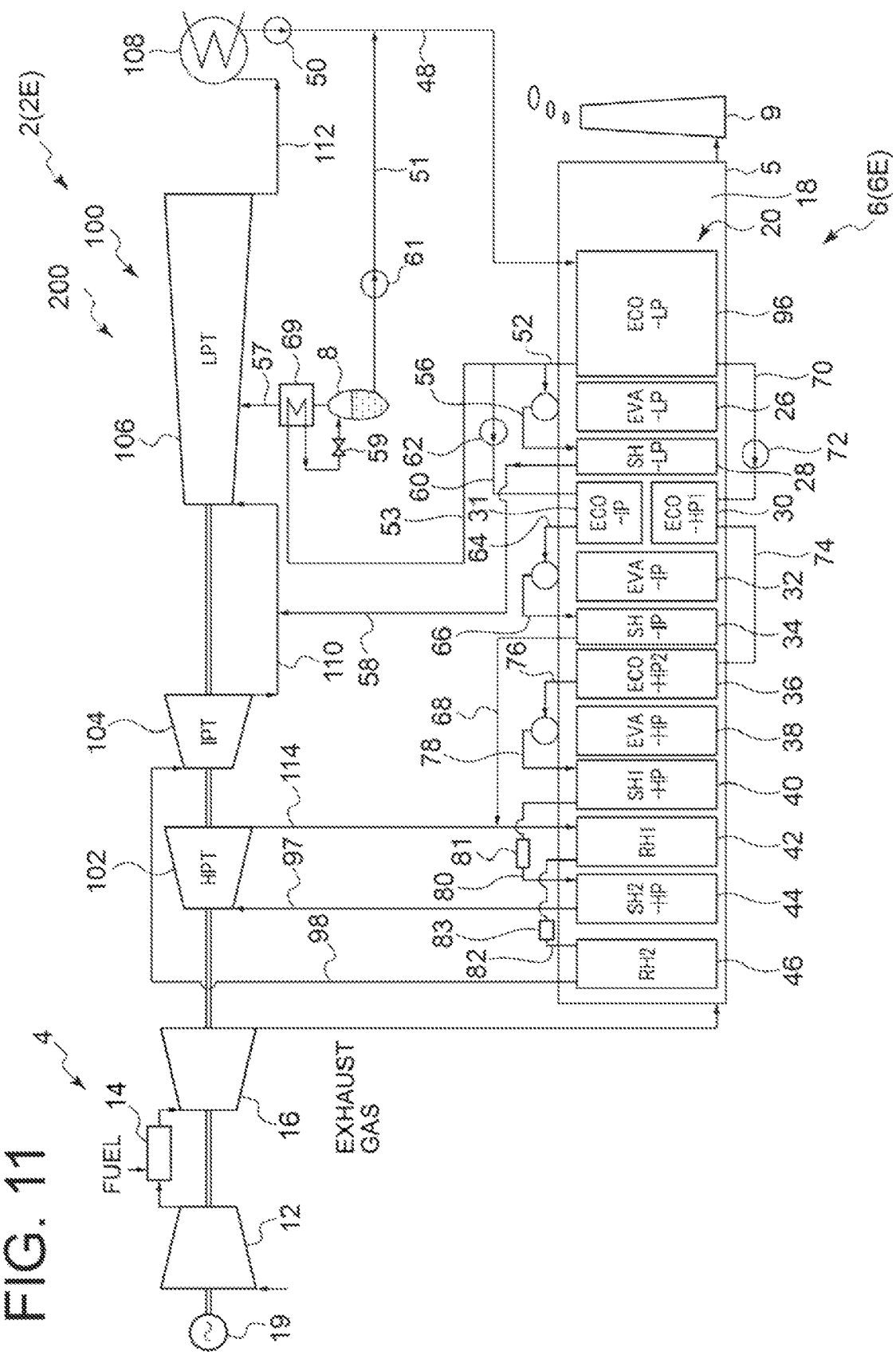
FIG. 11 is a schematic overall configuration diagram of a combined cycle plant 2 (2E) according to another embodiment.

In some embodiments, as illustrated in FIG. 11 for instance, the number of low-pressure economizer may be one. In the combined cycle plant 2 (2E) illustrated in FIG. 11, instead of the primary low-pressure economizer and the secondary low-pressure economizer 24 of the combined cycle plant 2 (2C) illustrated in FIG. 7, a single low-pressure economizer 96 is provided.

In the configuration illustrated in FIG. 11, the feed water line 48 connects the condenser 108 and the low-pressure economizer 96. The low-pressure economizer 96 heats water supplied from the teed water line 48 through heat exchange with exhaust gas. A part of water heated by the low-pressure economizer 96 is supplied to the low-pressure evaporator 26 via the feed water line 52 connecting the low-pressure economizer 96 and the low-pressure evaporator 26.

A part of water heated by the low-pressure economizer 96 is supplied to the intermediate-pressure economizer 31 via the feed water line 60, The feed water line 60 is branched from the feed water line 54 and connected to the intermediate-pressure economizer 31, and the heated water flowing through the feed water line 60 is pressure fed to the intermediate-pressure economizer 31 by the intermediate-pressure feed water pump 62 disposed in the feed water line 60.

The feed water line 53 branched from the feed water line 52 is connected to the flash tank 8, and a part of water heated by the low-pressure economizer 96 is supplied to the flash tank 8 via the feed water line 53. The pressure reducing valve 59 for reducing the pressure of heated water supplied from the low-pressure economizer 96 is disposed in the feed water line 53. The heated water supplied to the flash tank 8 via the feed water line 53 has its pressure reduced in the flash tank 8 to evaporate (flash), and turns into flash steam. The flash steam generated by the flash tank 8 is supplied to an intermediate stage of the low-pressure steam turbine 106 via the steam line 57 connecting the flash tank 8 and the intermediate stage of the low-pressure steam turbine 106.

The condensed water accumulated at the bottom portion of the flash tank 8 flows into the feed water line 48 via the condensed water line 51 connecting the flash tank 8 and the feed water line 48, and is supplied to the low-pressure economizer 96 via the feed water line 48. The feed water pump 61 is disposed in the condensed water line 51, and the condensed water discharged from the flash tank 8 is pressure fed to the low-pressure economizer 96 by the feed water pump 61.

Accordingly, even in a case where flash steam generated by acquiring feed water from a single location and flashing the feed water is superheated by the feed water before flashing, it is possible to utilize steam having a higher temperature than that without superheating, and it is possible to enhance the heat utilization efficiency. Furthermore, with the steam being in a superheated state, it is possible to suppress condensation inside a pipe such as the steam line 57, and suppress occurrence of troubles such as blockage of the pipe due to drain water, for instance. Furthermore, in a case where steam flowing out from the superheater 69 is used in the steam turbine, it is possible to reduce the wetness fraction at the downstream stage of the steam turbine and suppress erosion of the turbine blades, while enhancing the efficiency of the steam turbine.

Figure 12:
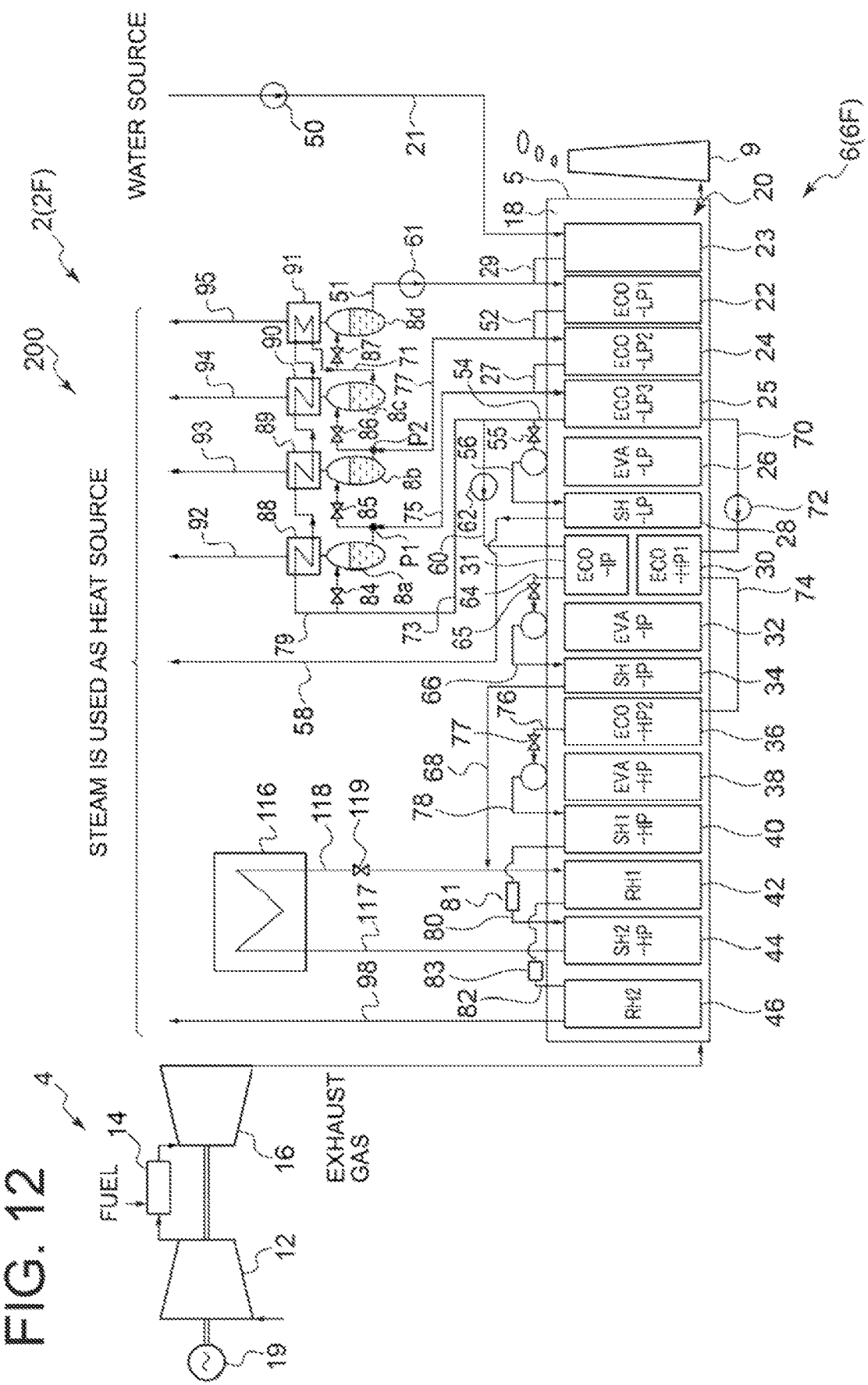
FIG. 12 is a schematic overall configuration diagram of a combined cycle plant 2 (2E) according to another embodiment.

In some embodiments, as illustrated in FIG. 12 for instance, the combined cycle plant 2 (2F) may be configured as a cogeneration plant which utilizes steam generated by the steam generation apparatus 6 as a heat source.

In the combined cycle plant 2 (2F) illustrated in FIG. 12, the steam generated from the steam generation apparatus 6, that is, the steam flowing through the steam lines 58, 92, 93, 94, 95, 117 may be used in usages such as chemical reaction, food processing, air conditioning (e.g., heating that uses steam as a heat source or cooling that uses steam as a heat source of an absorption refrigeration machine), and the like. In the illustrative embodiment depicted in FIG. 12, a heat exchanger 116 is disposed outside the heat recovery steam generator 5, and the high-pressure superheated steam superheated by the secondary high-pressure superheater 44 is supplied to the heat exchanger 116 via the steam line 117 connecting the secondary high-pressure superheater 44 and the heat exchanger 116. At the heat exchanger 116, the high-pressure superheated steam supplied via the steam line 117 may be used for the above usages. The high-pressure superheated steam after heat exchange at the heat exchanger 116 is supplied to the primary reheater 42 via the steam line 118 in which a valve 119 is disposed.

In the combined cycle plant illustrated in FIG. 10, the pressure reducing valve 84, and the flow control valves 205, 206 are disposed respectively in the feed water lines 73, 75, 77 for supplying feed water to the flash tanks 8a, 8b, 8c. By adjusting the opening degree of the above valves, it is possible to adjust the flow rate of feed water supplied to the flash tanks 8a, 8b, 8c. With the above configuration, it is possible to adjust the flow rate of each heat exchanger 20 (economizer), and thus it is possible to reduce the size of the heat exchangers while maintaining a relatively high heat utilization efficiency. While the above configuration of adjusting the flow rate of feed water supplied to the flash tanks is described referring to the combined cycle plant in FIG. 10 as an example, the configuration is also applicable to other embodiments.

Furthermore, in the combined cycle plant illustrated in FIG. 10, the pressure reducing valve 85 is disposed in the drain water line 71 at a position between the flash tank 8a and the flash tank 8b. The pressure reducing valve 86 is disposed in the drain water line 71 at a position between the flash tank 8b and the flash tank 8c. The pressure reducing valve 87 is disposed in the drain water line 71 at a position between the flash tank 8c and the flash tank 8d.

By adjusting the opening degrees of the pressure reducing valves 85 to 87 and adjusting the flow rate of drain water flowing through respective parts of the drain water line 71, the liquid level of drain water of the flash tanks 8a to 8c at the upstream side of the drain water line 71 is maintained to be constant, respectively. For instance, when the liquid level of the flash tank 8b upstream of the pressure reducing valve 86 increases, by increasing the opening degree of the pressure reducing valve 86 to increase the flow rate of drain water flowing through the pressure reducing valve 86, the liquid level of the flash tank 8b is reduced. Conversely, when the liquid level of the flash tank 8b decreases, by reducing the opening degree of the pressure reducing valve 86 to reduce the flow rate of drain water flowing through the pressure reducing valve 86, the liquid level of the flash tank 8b is increased, and the liquid level of the flash tank 8b is maintained to be constant.

As to the flash tank 8d not provided with a pressure reducing valve at the downstream side in the drain water line, the flow rate of the pump 61 is controlled to maintain a constant liquid level. Although not depicted, it is possible to control the flow rate of the pump 61 by a method of providing a recirculation flow passage for recirculating a part of drain water from the outlet to the inlet for the pump 61 and providing a flow control valve in the recirculation flow passage to adjust the recirculation flow rate with the flow control valve, or a method of driving the pump 61 with a motor with an inverter to control the rotation speed, for instance.

With the above configuration, it is possible to maintain the liquid level of the flash tank to be constant, prevent the low-pressure steam turbine 106 from sucking liquid through the steam lines (92 to 95), and maintain the reliability of the low-pressure steam turbine 106, while maintaining a sufficient amount of liquid in the flash tank and ensuring the amount of steam, thereby increasing the output of the low-pressure steam turbine 106 adequately and enhancing the plant efficiency. While the above configuration of maintaining a constant liquid level at the flash tank is described referring to the combined cycle plant in FIG. 10 as an example, the configuration is also applicable to other embodiments.

Embodiments of the present invention were described in detail above, but the present invention is not limited thereto, and various amendments and modifications may be implemented.

For instance, while exhaust gas is supplied to the heat recovery steam generator 5 from the gas turbine 4 in some embodiments described above, the supply source that supplies exhaust gas to the heat recovery steam generator 5 is not limited to the gas turbine, and may be another prime mover such as a gas engine, a boiler, or a fuel cell.

Furthermore, the exhaust gas heat recovery plant 200 including the above described steam generation apparatus 6 (6A to 6F) may be realized by remodeling an existing exhaust gas heat recovery plant.

In this case, the method of remodeling an exhaust gas heat recovery plant includes a step of increasing the number of economizers disposed at the downstream side of the primary evaporator 26 in the exhaust gas flow passage 18 to two or more, and a step of connecting the feed water line 52 connecting two adjacent economizers 22, 24 of the two or more economizers and a heat utilization facility such as the flash tank 8 via the feed water line 53, in order to produce the above generation apparatus 6 (6A) illustrated in FIG. 1 for instance by modification.

Accordingly, compared to a case where the temperature of feed water is brought closer to a saturation steam temperature using a single economizer, it is possible to enhance the heat utilization efficiency of the heat medium by using a heat utilization facility such as the flash tank 8, while suppressing a size increase of the economizer (the total of the size of two or more economizers).

The contents described in the above respective embodiments can be understood as follows, for instance.

(1) A steam generation apparatus (6) according to an embodiment of the present disclosure includes: a heat medium flow passage (18) through which a heat medium flows; a primary economizer (22) disposed in the heat medium flow passage; a secondary economizer (24) disposed in the heat medium flow passage at an upstream side of the primary economizer with respect to a flow direction of the heat medium; a primary evaporator (26) disposed in the heat medium flow passage at an upstream side of the secondary economizer with respect to the flow direction of the heat medium; a first feed water line (52, 27) configured to supply water heated by the primary economizer to the secondary economizer; and a second feed water line (53, 55, 77) heated by the primary economizer to a heat utilization facility (8, 51, 61, 120, 122, 129, 130, 132).

The steam generation apparatus described above (1) includes the first feed water line for supplying water from the primary economizer to the secondary economizer and the second feed water line disposed so as to branch from the first feed water line and supply water to a heat utilization facility, and thus the flow rate of the secondary economizer is smaller than the flow rate of the primary economizer. Thus, even if the flow rate of the feed water of the primary economizer increases in accordance with the flow rate of the feed water supplied to the heat utilization facility, it is possible to bring the temperature of the feed water closer to a saturation steam temperature with a high efficiency, using the secondary economizer having a relatively small size. Thus, compared to a case where the temperature of feed water is brought closer to a saturation steam temperature using a single economizer, it is possible to enhance the heat utilization efficiency of the heat medium by using the heat utilization facility, while suppressing a size increase of the economizer (the total of the size of the primary economizer and the size of the secondary economizer).

(2) In some embodiments, in the steam generation apparatus according to the above (1), the heat utilization facility is a first flash tank (8) for generating flash steam.

The steam generation apparatus described above (2) includes the first feed water line for supplying water from the primary economizer to the secondary economizer and the second feed water line disposed so as to branch from the first feed water line and supply water to the first flash tank, and thus the flow rate of the secondary economizer is smaller than the flow rate of the primary economizer. Thus, even if the flow rate of the feed water of the primary economizer increases in accordance with the flow rate of the feed water supplied to the flash tank, it is possible to bring the temperature of the feed water closer to a saturation steam temperature with a high efficiency, using the secondary economizer having a relatively small size. Thus, compared to a case where the temperature of feed water is brought closer to a saturation steam temperature using a single economizer, it is possible to enhance the heat utilization efficiency of the heat medium by using the flash tank, while suppressing a size increase of the economizer (the total of the size of the primary economizer and the size of the secondary economizer).

(3) In some embodiments, in the steam generation apparatus according to the above (2), a plurality of evaporators (26, 32, 38) including the primary evaporator are disposed in the heat medium flow passage, and the primary evaporator is positioned most downstream among the plurality of evaporators with respect to the flow direction of the heat medium flow passage.

The temperature of steam and condensed water obtained, by flashing is lower than the temperature of water before flashing, and thus the heat utilization efficiency of steam generation by flashing is lower than that of an evaporator. In a case where another evaporator is provided at the downstream side of an economizer that obtains water for flashing with respect to the flow direction of the heat medium (exhaust gas), acquisition of water for flashing leads to a decrease in the heat quantity of the heat medium (exhaust gas) supplied to the other evaporator at the downstream side, and a decrease in the heat quantity which can be utilized by the other evaporator at the downstream side. Thus, while the steam generation amount from the evaporator having a high heat utilization efficiency decreases, the flow rate of flash steam having a lower heat utilization efficiency increases, and thereby the heat utilization efficiency decreases. Meanwhile, in the steam generation apparatus described in the above (2), feed water is obtained from the economizer further downstream of the most downstream evaporator, that is, the primary, evaporator, with respect to the flow direction of the heat medium flow passage, and the feed water is flashed. Thus, it is possible to obtain flash steam without reducing the amount of steam generated by the evaporator, which makes it possible to utilize heat of the heat medium effectively without reducing the heat utilization efficiency, and achieve a particularly high effect of improving the plant efficiency. Furthermore, also in a case where feed water obtained from an economizer is utilized in usages other than generation of flash steam, with the primary evaporator being positioned at the most downstream side with respect to the flow direction of the heat medium flow passage, it is possible to obtain feed water without reducing the evaporation amount at the other evaporators, and thus it possible to achieve a particularly high effect of improving the plant efficiency.

(4) In some embodiments, in the steam generation apparatus according to the above (2), at least one of a third feed water line (63) configured to supply water heated by the secondary economizer to the first flash tank or a fourth feed water line (F, F, G, H) disposed so as to branch from a feed water line for supplying water to the primary economizer and configured to supply water to the first flash tank.

With the steam generation apparatus according to the above (4), by supplying feed water acquired from the at least two feed water lines including the second feed water line to the first flash tank, it is possible to adjust the flow rate of the secondary economizer, and achieve a high efficiency with an economizer having an appropriate size. Furthermore, it is possible to maintain the feed water temperature at the outlet of the secondary economizer, which affects the evaporation amount of the primary evaporator and is especially important, at a high temperature (maintain the approach temperature difference of the primary evaporator close to zero), and maintain the temperature difference between exhaust gas and feed water at the primary economizer to a constant value that is greater than that at the feed water outlet of the primary economizer. Herein, when the temperature difference between exhaust gas and feed water is constant, the heat exchange amount is maximized relative to the size. Thus, it is possible to reduce the size of the primary economizer reasonably, while increasing the size of only the secondary economizer, which is especially important in terms of performance, thereby enhancing the efficiency.

(5) In some embodiments, the steam generation apparatus according to any one of the above (2) to (4) further includes: a first steam line (57, 93, 94, 95) for supplying steam generated by the first flash tank to a facility (100) which utilizes the steam; and a superheater (69, 89, 90, 91), disposed in the first steam line, for superheating the steam generated by the first flash tank.

With the steam generation apparatus described in the above (5), by superheating steam flowing through the first steam line with the superheater utilizing high-temperature feed water, it is possible to utilize steam having a higher temperature than in a case the steam is not superheated, and thus it is possible to enhance the heat utilization efficiency. Furthermore, with the steam being in a superheated state, it is possible to suppress condensation inside a pipe such as the steam line, and suppress occurrence of troubles such as blockage of the pipe due to drain water, for instance.

(6) In some embodiments, in the steam generation apparatus according to any one of the above (2) to (5), the steam generation apparatus comprises a plurality of flash tanks (8a, to 8d) including the first flash tank, and pressures of the plurality of flash tanks are set to be different from one another.

With the steam generation apparatus described in the above (6), the saturated water of the flash tanks is sent sequentially to a flash tank having a lower pressure and a lower temperature to be evaporated, whereby it is possible to recover heat in accordance with temperature and enhance the heat utilization efficiency.

(7) In some embodiments, the steam generation apparatus according to the above (6) further includes: a drain water line (71) which connects the plurality of flash tanks in series and through which drain water discharged from each of the flash tanks flows, and a fifth feed water line (75, 77) for supplying water heated by the primary economizer or the secondary economizer to the drain water line. A temperature of the water in the fifth feed water line is lower than a saturation temperature corresponding to a pressure of a flash tank, from among the plurality of flash tanks, positioned at an upstream side of a position where the drain water line and the fifth feed water line connect, with respect to a flow direction of the drain water line, and higher than a saturation temperature corresponding to a pressure of a flash tank, from among the plurality of flash tanks, positioned at a downstream side of a position where the drain water line and the fifth feed water line connect, with respect to the flow direction of the drain water line.

With the steam generation apparatus described in the above (7), a plurality of flash tanks having different pressures are provided, and feed water of a plurality of locations is fed to locations of the drain water line each having an appropriate temperature in accordance with the temperature of the feed water, whereby it is possible to enhance the heat utilization efficiency.

(8) In some embodiments, in the steam generation apparatus according to any one of the above (2) to (7), the steam generation apparatus comprises a plurality of economizers including the primary economizer and the secondary economizer at a downstream side of the primary evaporator with respect to the flow direction of the heat medium in the heat medium flow passage, and the steam generation apparatus is configured to utilize, as a heat source, a part of water flowing out from an outlet of at least one of the plurality of economizers.

With the steam generation apparatus described in the above (8), by utilizing a part of water flowing out from the outlet of at least one economizer of the plurality of economizers as a heat source, it is possible to enhance the heat utilization efficiency taking account of an external configuration of the steam generation apparatus as well.

(9) In some embodiments, in the steam generation apparatus according to any one of the above (2) to (8), the steam generation apparatus comprises a plurality of economizers including the primary economizer and the secondary economizer at a downstream side of the primary evaporator with respect to the flow direction of the heat medium in the heat median flow passage, and the steam generation apparatus is configured to recover exhaust heat by utilizing, as a cooling medium, a part of water flowing through a feed water line connecting to an inlet of at least one of the plurality of economizers.

With the steam generation apparatus described in the above (9), by utilizing a part of water flowing through the line for feeding water to the inlet of at least one economizer of the plurality of economizers as a cooling medium to recover exhaust heat, it is possible to enhance the heat utilization efficiency taking account of an external configuration of the steam generation apparatus as well.

(10) A steam generation apparatus according to the present disclosure includes: a heat medium flow passage (18) through which a heat medium flows; an economizer (96, 25) disposed in the heat medium flow passage; a primary evaporator (26) disposed in the heat medium flow passage at an upstream side of the economizer with respect to a flow direction of the heat medium; a first flash tank (8) for generating flash steam; a first feed water line (52, 54) for supplying water from the economizer to the primary evaporator; a second feed water line (53, 73) branched from the first feed water line and connected to the first flash tank; and a superheater (69, 88) disposed in the second feed water line and configured to superheat steam generated by the first flash tank with water flowing through the second feed water line.

(11) In some embodiments, in the steam generation apparatus according to any one of the above (2) to (10), the steam generation apparatus is configured such that a flow rate of feed water supplied to the first flash tank is adjusted through adjustment of an opening degree of a valve (84, 205, 206) disposed in the second feed water line.

With the steam generation apparatus described in the above (11), it is possible to adjust the flow rate of the economizer, and thus it is possible to reduce the size of the economizer while maintaining a relatively high heat utilization efficiency.

(12) In some embodiments, in the steam generation apparatus according to any one of the above (2) to (11), the steam generation apparatus is configured to adjust a liquid level of the first flash tank through adjustment of at least one of an opening degree of a valve (85, 86, 87) disposed in a line (71) through which drain water from the first flash tank flows, or a flow rate of a pump (61) disposed in the line through which the drain water from the first flash tank flows.

With the steam generation apparatus described in the above (12), by adjusting at least one of the valve opening degree or the pump flow rate, it is possible to adjust the liquid level of the first flash tank to be constant.

(13) In some embodiments, in the steam generation apparatus according to the above (1), the heat utilization facility is configured to heat a to-be-heated medium by letting the to-be-heated medium exchange heat with water heated by the primary economizer or by mixing the to-be-heated medium with the water heated by the primary economizer.

With the steam generation apparatus described in the above (13), when a to-be-heated medium is heated by using heated water from the outlet of the primary economizer having a lower temperature than the inlet feed water of the evaporator, it is possible to improve the heat utilization efficiency without impairing the usefulness of heat significantly.

(14) In some embodiments, in the steam generation apparatus according to the above (13), the to-be-heated medium has a temperature not higher than 100 degree Celsius.

With the steam generation apparatus described in the above (14), when a to-be-heated medium having a temperature not higher than 100° C. is heated by using heated water from the outlet of the primary economizer having a lower temperature than the inlet feed water of the evaporator, it is possible to improve the heat utilization efficiency without impairing the usefulness of heat significantly.

(15) In some embodiments, in the steam generation apparatus according to the above (1), the heat utilization facility is configured to let a to-be-cooled medium exchange heat with water heated by the primary economizer to cool the to-be-cooled medium, and further heat the water heated by the primary economizer.

With the steam generation apparatus described in the above (15), even in a case where the cooling medium needs to be cooled to a temperature lower than the saturation temperature at the steam pressure of the primary evaporator, it is possible to recover exhaust heat to feed water having an appropriate temperature, and it is possible to recover exhaust heat efficiently.

(16) In some embodiments, in the steam generation apparatus according to the above (15), the heat utilization facility is configured to heat the water heated by the primary economizer to a temperature higher than 100 degree Celsius.

Heat over 100° C. is capable of generating steam of ordinary pressure, and thus heat over 100° C. and heat not over 100° C. are considerably different in terms of usefulness. Thus, as in the steam generation apparatus described in the above (16), by utilizing exhaust heat from temperature reduction of the to-be-cooled medium effectively to heat water at the outlet of the economizer having a temperature not higher than 100° C. to a temperature higher than 100° C. it is possible to recover useful heat, and enhance the heat utilization efficiency notably.

(17) In some embodiments, the steam generation apparatus according to the above (15) includes a plurality of economizers including the primary economizer and the secondary economizer at a downstream side of the primary evaporator with respect to the flow direction of the heat medium in the heat medium flow passage. Among the plurality of economizers, the economizer positioned most upstream with respect to the flow direction of the heat medium in the heat medium flow passage is configured to supply heated feed water to the primary evaporator, and the heat utilization facility is configured to cool the to-be-cooled medium to a temperature not higher than a saturation temperature corresponding to a steam pressure of the primary evaporator.

With the steam generation apparatus described in the above (17), by obtaining feed water midway from between the plurality of economizers and utilizing the feed water for heat recovery, even in a case where the to-be-cooled medium needs to be cooled to a temperature not higher than the saturation temperature corresponding to the steam pressure of the primary evaporator, it is possible to recover exhaust heat to feed water of an appropriate temperature, and it is possible to recover exhaust heat efficiently.

(18) A steam generation apparatus (6) according to the present disclosure includes: a heat medium flow passage (18) through which a heat medium flows; a primary economizer (24) disposed in the heat medium flow passage; a secondary economizer (25) disposed in the heat medium flow passage at an upstream side of the primary economizer with respect to a flow direction of the heat medium; a primary evaporator (26) disposed in the heat medium flow passage at an upstream side of the secondary economizer with respect to the flow direction of the heat medium; a first feed water line (52, 27) configured to supply water heated by the primary economizer to the secondary economizer; and a sixth feed water line (54) configured to supply water heated by the secondary economizer to the primary evaporator without letting the water exchange heat with the heat medium, and feed water flowing to the secondary economizer has a smaller mass flow rate than feed water flowing to the primary economizer.

With the steam generation apparatus described in the above (18), it is possible to maintain the temperature difference between exhaust gas and feed water at a nearly constant appropriate temperature difference, and realize a relatively high heat utilization efficiency with a small-sized economizer.

(19) In some embodiments, in the steam generation apparatus according to the above (18), the steam generation apparatus includes a tertiary economizer (22) at a downstream side of the secondary economizer with respect to the flow direction of the heat medium in the heat medium flow passage, and the mass flow rate of the feed water flowing to the secondary economizer is smaller than a mass flow rate of feed water flowing to the tertiary economizer.

With the steam generation apparatus described in the above (19), it is possible to maintain the temperature difference between exhaust gas and teed water at a nearly constant appropriate temperature difference to the downstream side with respect to the flow of the heat medium, and achieve a high heat utilization efficiency with an even smaller-sized economizer.

(20) In some embodiments, in the steam generation apparatus according to the above (18) or (19), the steam generation apparatus includes a plurality of economizers including the primary economizer and the secondary economizer at a downstream side of the primary evaporator with respect to the flow direction of the heat medium in the heat medium flow passage, and includes a feed water acquisition line (E, K, G, I, M, 77) for acquiring a part of water flowing out from an outlet of one of the plurality of economizers.

With the steam generation apparatus described in the above (20), by obtaining feed water, it is possible to adjust the feed water flow rate of the previous and subsequent economizers, realize the preferable slope of the TQ diagram, and realize a relatively high heat utilization efficiency with a small-sized economizer.

(21) In some embodiments, in the steam generation apparatus according to the above (20), the steam generation apparatus comprises two or more of the feed water acquisition line each of which acquires a part of water flowing out from an outlet of a different one of the plurality of economizers from one another.

With the steam generation apparatus described in the above (21), it is possible to obtain feed water from a location having an appropriate temperature suitable for the usage in a heat utilization facility that utilizes feed water, and thus it is possible to enhance the heat utilization facility and improve the plant efficiency.

(22) In some embodiments, in the steam generation apparatus according to the above (18), the steam generation apparatus comprises a plurality of economizers including the primary economizer and the secondary economizer at a downstream side of the primary evaporator with respect to the flow direction of the heat medium in the heat medium flow passage, and includes a feed water supply line for supplying feed water to an inlet of one of the plurality of economizers.

With the steam generation apparatus described in the above (22), by supplying feed water, it is possible to adjust the feed water flow rate of the previous and subsequent economizers, realize the preferable slope of the TQ diagram as described above, and realize a relatively high heat utilization efficiency with a small-sized economizer.

(23) In some embodiments, in the steam generation apparatus according to the above (20) or (21), the steam generation apparatus includes at least one feed water supply line (F, H) for supplying feed water to an inlet of one of the plurality of economizers.

With the steam generation apparatus described in the above (23), both of the feed water acquisition lines and the feed water supply lines are provided, and thus it is possible to enhance the heat utilization efficiency and improve the efficiency of the plant even more effectively.

(24) In some embodiments, in the steam generation apparatus according to the above (22) or (23), the steam generation apparatus comprises two or more of the feed water supply line each of which supplies feed water to an inlet of a different one of the plurality of economizers from one another.

With the steam generation apparatus described in the above (24), it is possible to supply feed water from a location having a close temperature suitable for the usage in a heat utilization facility that utilizes feed water, and thus it is possible to enhance the heat utilization facility and improve the plant efficiency.

(25) In some embodiments, in the steam generation apparatus according to any one of the above (22) to (24), the feed water supply line is configured to supply feed water having a temperature lower than that at a feed water outlet of the economizer to which the feed water is supplied, and higher than that at a feed water inlet of the economizer disposed downstream of the economizer to which the feed water is supplied, with respect to the flow direction of the heat medium.

With the steam generation apparatus described in the above (25), it is possible to reduce the temperature difference between the feed water at a mixing location and the feed water to be supplied. Accordingly, it is possible to reduce the temperature difference between the feed water inlet temperature of the economizer whose inlet is the recipient of the supplied feed water, and the feed water outlet temperature of the economizer disposed, by connecting the feed water line, at the downstream side with respect to the flow direction of the heat medium (exhaust gas) (the upstream side with respect to the flow direction of the feed water), Accordingly, it is possible to obtain a high heat utilization efficiency with a small-sized economizer.

(26) In some embodiments, in the steam generation apparatus according to any one of the above (20), (21), (23), the steam generation apparatus further comprises a motive power generation apparatus (8, 106), and is configured to send feed water obtained from at least one of the feed water acquisition lines to the motive power generation apparatus, and the motive power generation apparatus generates motive power using received feed water.

With the steam generation apparatus described in the above (26), it is possible to utilize heat of feed water effectively to extract motive power, and thereby the efficiency of the plant is enhanced.

(27) In some embodiments, in the steam generation apparatus according to any one of the above (18) to (26), the steam generation apparatus is configured to send an entire amount of water heated by the secondary economizer to at least one of the primary evaporator or a high-temperature heat exchanger (30, 31) which heats water to a temperature higher than a saturation temperature corresponding to a steam pressure of the primary evaporator.

With the steam generation apparatus described in the above (27), by not sending the feed water heated by the secondary economizer which directly sends feed water to the primary evaporator to various heat utilization facilities used for heat utilization of a relatively low temperature, but sending the feed water to at least one of the primary evaporator or a high-temperature heat exchanger which heats feed water to a temperature higher than the saturation temperature corresponding to the steam pressure of the primary evaporator, it is possible to reduce the flow rate of feed water heated by the secondary economizer.

Accordingly, it is possible to bring the temperature distribution of feed water flowing through the economizer closer to the preferable temperature distribution, increase the slope of the line corresponding to feed water of the secondary economizer in the TQ line graph, bring the temperature of feed water supplied to the primary evaporator closer to the saturation temperature corresponding to the steam pressure of the primary evaporator, and enhance the heat utilization efficiency.

(28) An exhaust gas heat recovery plant (200) according to an embodiment of the present disclosure includes: the steam generation apparatus (6) according to any one of the above (1) to (27); and a steam utilization facility (100) which utilizes steam generated by the steam generation apparatus.

The exhaust gas heat recovery plant described in the above (28) includes the steam generation apparatus according to any one of the above (1) to (27), and thus it is possible to enhance the efficiency of heat utilization of the heat medium using the flash tank, while suppressing an increase in the size of the economizers (the total of the size of the primary economizer and the size of the secondary economizer). Accordingly, it is possible to suppress a size increase of the exhaust gas heat recovery plant and enhance the heat utilization efficiency at the exhaust gas heat recovery-plant.

(29) A combined cycle plant (2) according to an embodiment of the present disclosure includes: the exhaust gas heat recovery plant according to the above (28); and a prime mover (4), a boiler, or a fuel cell. The steam utilization facility includes a steam turbine (102, 104, 106), and the heat medium is an exhaust gas of the prime mover, an exhaust gas of the boiler, or an exhaust gas of the fuel cell.

With the steam generation apparatus described in the above (29), it is possible to recover thermal energy of exhaust gas of the prime mover, exhaust gas of the boiler, or exhaust gas of the full cell with an exhaust gas heat recovery plant at a high efficiency. Furthermore, it is possible to reduce the wetness fraction at the downstream stage of the steam turbine and suppress erosion of the turbine blades, while enhancing the efficiency of the steam turbine.

(30) A cogeneration plant (2) according to an embodiment of the present disclosure includes: the exhaust gas heat recovery plant according to the above (28); and a prime mover (4), a boiler, or a fuel cell. The steam utilization facility is configured to utilize the steam as a heat source, and the heat medium is an exhaust gas of the prime mover, an exhaust gas of the boiler, or an exhaust gas of the fuel cell.

With the steam generation apparatus described in the above (30), it is possible to recover thermal energy of exhaust gas of the prime mover, exhaust gas of the boiler, or exhaust gas of the full cell with an exhaust gas heat recovery plant at a high efficiency. Furthermore, by utilizing steam generated by the steam generation apparatus as a heat source, it is possible to realize a co-generation plant of a high heat utilization efficiency.

(31) A method of remodeling an exhaust gas heat recovery plant according to an embodiment of the present disclosure includes: a step of increasing the number of economizers (22, 24, 25) disposed at a downstream side of a primary evaporator (26) in a heat medium flow passage (18) to two or more; and a step of connecting a flash tank (8) a feed water line (52, 27) which connects a pair of adjacent economizers of the two or more economizers.

According to the above method of remodeling an exhaust gas heat recovery plant described in the above (31), compared to a case where the temperature of feed water is brought closer to a saturation steam temperature using a single economizer, it is possible to enhance the heat utilization efficiency of the heat medium by using the flash tank, while suppressing a size increase of the economizer (the total of the size of the primary economizer and the size of the secondary economizer).

(32) A method of generating steam according to an embodiment of the present disclosure includes: a step of supplying water heated by a primary economizer (22) disposed in a heat medium flow passage (18) to a secondary economizer (24) disposed at an upstream side of the primary economizer with respect to a flow direction of a heat medium of the heat medium flow passage; a step of supplying water heated by the secondary economizer to a primary evaporator (26) disposed at an upstream side of the secondary economizer with respect to the flow direction of the heat medium of the heat medium flow passage; and a step of supplying the water heated by the primary economizer to a heat utilization facility (8, 51, 61, 120, 122, 129, 130, 132) via a second feed water line (53, 75, 77) branched from a first feed water line (52, 27) connecting the primary economizer and the secondary economizer.

According to the above steam generation method described in the above (32), water heated by the primary economizer is supplied to a heat utilization facility via the second feed water line branched from the first feed water line connecting the primary economizer and the secondary economizer, and thus the flow rate of the secondary economizer is smaller than the flow rate of the primary economizer. Thus, even if the flow rate of the feed water of the primary economizer increases in accordance with the flow rate of the feed water supplied to the heat utilization facility, it is possible to bring the temperature of the feed water closer to a saturation steam temperature with a high efficiency, using the secondary economizer of a relatively small size. Thus, compared to a case where the temperature of feed water is brought closer to a saturation steam temperature using a single economizer, it is possible to enhance the heat utilization efficiency of the heat medium by using the heat utilization facility, while suppressing a size increase of the economizer (the total of the size of the primary economizer and the size of the secondary economizer).

REFERENCE SIGNS LIST

2 Combined cycle plant
4 Gas turbine
5 Heat recovery steam generator
6 (6a to 6b) Steam generation apparatus
8 (8a to 8b) Flash tank
9 Stack
12, 140 Compressor
14 Combustor
16 Turbine
18 Exhaust gas flow passage
19 Generator
20, 116, 120, 122, 124 Heat exchanger
126, 128, 129, 130, 132 Heat exchanger
21, 48 Feed water line
22 Primary low-pressure economizer
23 Low-temperature heat exchanger
24 Secondary low-pressure economizer
25 Tertiary low-pressure economizer
26 Low-pressure evaporator
27, 29, 48, 52, 53, 54, 69 Feed water line
63, 64, 70, 73, 74, 75, 76, 77, 709 Feed water line
28 Low-pressure superheater
30 Primary high-pressure economizer
31 Intermediate-pressure economizer
32 Intermediate-pressure evaporator
34 Intermediate-pressure superheater
36 Secondary high-pressure economizer
38 High-pressure evaporator
40 Primary high-pressure superheater
42 Primary reheater
44 Secondary high-pressure superheater
46 Secondary reheater
50 Condenser pump
51 Condensed water line
55, 65, 77 Feed water valve
56, 57, 58, 66, 68, 78, 80 Steam line
86, 92, 93, 94, 95, 97, 117, 118 Steam line
59, 84, 85, 86, 87 Pressure reducing valve
61 Feed water pump
62 Intermediate-pressure feed water pump
69, 88, 89, 90, 91 Superheater
71 Drain water line
72 High-pressure feed water pump
81, 83 Desuperheater
82, 98 Reheated steam line
96 Low-pressure economizer
100 Steam turbine system
102 High-pressure steam turbine
104 Intermediate-pressure steam turbine
106 Low-pressure steam turbine
108 Condenser
110 Intermediate-pressure exhaust steam line
112 Low-pressure exhaust steam line
114 High-pressure exhaust steam line
119 Valve
126 Cooling medium cooler
127 Bearing
128 Lubricant oil cooler
134 Cooling air line
136, 138 Extracted air line
142 Low-boiling point medium Rankine cycle
200 Exhaust gas heat recovery plant
205, 206 Flow control valve

The invention claimed is:

1. A steam generation apparatus comprising:
a heat medium flow passage through which a heat medium flows;
a primary economizer disposed in the heat medium flow passage;
a secondary economizer disposed in the heat medium flow passage at an upstream side of the primary economizer with respect to a flow direction of the heat medium;
a primary evaporator disposed in the heat medium flow passage at an upstream side of the secondary economizer with respect to the flow direction of the heat medium;
a first feed water line configured to supply water heated by the primary economizer to the secondary economizer; and
a second feed water line disposed so as to branch from the first feed water line and configured to supply the water heated by the primary economizer to a heat utilization facility,
wherein a plurality of evaporators including the primary evaporator are disposed in the heat medium flow passage, and
wherein the primary evaporator is positioned most downstream among the plurality of evaporators with respect to the flow direction of the heat medium flow passage.

2. The steam generation apparatus according to claim 1, wherein the heat utilization facility is a first flash tank for generating flash steam.

3. The steam generation apparatus according to claim 2, further comprising:
at least one of a third feed water line for supplying water heated by the secondary economizer to the first flash tank or a fourth feed water line disposed so as to branch from a feed water line for supplying water to the primary economizer and configured to supply water to the first flash tank.

4. The steam generation apparatus according to claim 2, further comprising:
a first steam line for supplying steam generated by the first flash tank to a facility which utilizes the steam; and
a superheater, disposed in the first steam line, for superheating the steam generated by the first flash tank.

5. The steam generation apparatus according to claim 2, wherein the steam generation apparatus comprises a plurality of flash tanks including the first flash tank, and
wherein pressures of the plurality of flash tanks are set to be different from one another.

6. The steam generation apparatus according to claim 2, wherein the steam generation apparatus comprises a plurality of economizers including the primary economizer and the secondary economizer at a downstream side of the primary evaporator with respect to the flow direction of the heat medium in the heat medium flow passage, and
wherein the steam generation apparatus is configured to utilize, as a heat source, a part of water flowing out from an outlet of at least one of the plurality of economizers.

7. The steam generation apparatus according to claim 2, wherein the steam generation apparatus comprises a plurality of economizers including the primary economizer and the secondary economizer at a downstream side of the primary evaporator with respect to the flow direction of the heat medium in the heat medium flow passage, and
wherein the steam generation apparatus is configured to recover exhaust heat by utilizing, as a cooling medium, a part of water flowing through a feed water line connecting to an inlet of at least one of the plurality of economizers.

8. A steam generation apparatus comprising:
a heat medium flow passage through which a heat medium flows;
an economizer disposed in the heat medium flow passage;
a primary evaporator disposed in the heat medium flow passage at an upstream side of the economizer with respect to a flow direction of the heat medium;
a first flash tank for generating flash steam;
a first feed water line configured to supply water heated by the economizer to the primary evaporator;
a second feed water line disposed so as to branch from the first feed water line and configured to supply the water heated by the economizer to the first flash tank; and
a superheater disposed in the second feed water line and configured to superheat steam generated by the first flash tank with water flowing through the second feed water line,
wherein the steam generated by flashing water heated by the economizer is superheated by not-yet flashed water heated by the economizer.

9. The steam generation apparatus according to claim 2, wherein the steam generation apparatus is configured such that a flow rate of feed water supplied to the first flash tank is adjusted through adjustment of an opening degree of a valve disposed in the second feed water line.

10. The steam generation apparatus according to claim 2, wherein the steam generation apparatus is configured to adjust a liquid level of the first flash tank through adjustment of at least one of an opening degree of a valve disposed in a line through which drain water from the first flash tank flows, or a flow rate of a pump disposed in the line through which the drain water from the first flash tank flows.

11. The steam generation apparatus according to claim 1, wherein the heat utilization facility is configured to heat a to-be-heated medium by letting the to-be-heated medium exchange heat with water heated by the primary economizer or by mixing the to-be-heated medium with the water heated by the primary economizer.

12. The steam generation apparatus according to claim 1, wherein the heat utilization facility is configured to let a to-be-cooled medium exchange heat with water heated by the primary economizer to cool the to-be-cooled medium, and further heat the water heated by the primary economizer.

13. A steam generation apparatus comprising:
a heat medium flow passage through which a heat medium flows;
a primary economizer disposed in the heat medium flow passage;
a secondary economizer disposed in the heat medium flow passage at an upstream side of the primary economizer with respect to a flow direction of the heat medium;
a primary evaporator disposed in the heat medium flow passage at an upstream side of the secondary economizer with respect to the flow direction of the heat medium;
a first feed water line configured to supply water heated by the primary economizer to the secondary economizer; and a sixth feed water line configured to supply water heated by the secondary economizer to the primary evaporator without letting the water exchange heat with the heat medium, wherein feed water flowing to the secondary economizer has a smaller mass flow rate than feed water flowing to the primary economizer, wherein the steam generation apparatus comprises a plurality of economizers including the primary economizer and the secondary economizer at a downstream side of the primary evaporator with respect to the flow direction of the heat medium in the heat medium flow passage, and includes a feed water acquisition line for acquiring a part of water flowing out from an outlet of one of the plurality of economizers.

14. The steam generation apparatus according to claim 13, wherein the steam generation apparatus comprises a tertiary economizer at a downstream side of the secondary economizer with respect to the flow direction of the heat medium in the heat medium flow passage, and the mass flow rate of the feed water flowing to the secondary economizer is smaller than a mass flow rate of feed water flowing to the tertiary economizer.

15. The steam generation apparatus according to claim 13, wherein the steam generation apparatus comprises two or more of the feed water acquisition line each of which acquires a part of water flowing out from an outlet of a different one of the plurality of economizers from one another.

16. The steam generation apparatus according to claim 13, wherein the steam generation apparatus comprises a plurality of economizers including the primary economizer and the secondary economizer at a downstream side of the primary evaporator with respect to the flow direction of the heat medium in the heat medium flow passage, and includes a feed water supply line for supplying feed water to an inlet of one of the plurality of economizers.

17. The steam generation apparatus according to claim 13, wherein the steam generation apparatus includes a feed water supply line for supplying feed water to an inlet of one of the plurality of economizers.

18. The steam generation apparatus according to claim 13, wherein the steam generation apparatus further comprises a motive power generation apparatus, and is configured to send feed water obtained from at least one of the feed water acquisition lines to the motive power generation apparatus, and the motive power generation apparatus generates motive power using received feed water.

19. The steam generation apparatus according to claim 13, wherein the steam generation apparatus is configured to send an entire amount of water heated by the secondary economizer to at least one of the primary evaporator or a high-temperature heat exchanger which heats water to a temperature higher than a saturation temperature corresponding to a steam pressure of the primary evaporator.

20. An exhaust gas heat recovery plant, comprising:
the steam generation apparatus according to claim 1; and
a steam utilization facility which utilizes steam generated by the steam generation apparatus.

* * * * *